United States Patent
Kondo et al.

(10) Patent No.: US 7,895,274 B2
(45) Date of Patent: Feb. 22, 2011

(54) INFORMATION PROCESSING APPARATUS AND PROGRAM FOR PROVIDING IMAGE DATA TO A TERMINAL

(75) Inventors: Hirohito Kondo, Kanagawa (JP); Tomoki Shiono, Kanagawa (JP); Hiroshi Nagatani, Tokyo (JP); Yosuke Kaneda, Kanagawa (JP); Takaaki Sakai, Tokyo (JP)

(73) Assignee: Sony Corporation, Tokyo (JP)

( * ) Notice: Subject to any disclaimer, the term of this patent is extended or adjusted under 35 U.S.C. 154(b) by 1202 days.

(21) Appl. No.: 10/450,041

(22) PCT Filed: Oct. 11, 2002

(86) PCT No.: PCT/JP02/10574

§ 371 (c)(1),
(2), (4) Date: Aug. 6, 2004

(87) PCT Pub. No.: WO03/034233

PCT Pub. Date: Apr. 24, 2003

(65) Prior Publication Data

US 2005/0188001 A1      Aug. 25, 2005

(30) Foreign Application Priority Data

Oct. 11, 2001   (JP)   ............................. 2001-314531

(51) Int. Cl.
*G06F 15/16* (2006.01)
(52) U.S. Cl. ...................................... 709/206; 709/200
(58) Field of Classification Search ................. 709/206, 709/200

See application file for complete search history.

(56) References Cited

U.S. PATENT DOCUMENTS

| | | | | |
|---|---|---|---|---|
| 5,864,681 A | * | 1/1999 | Proctor et al. | 709/247 |
| 6,583,813 B1 | * | 6/2003 | Enright et al. | 348/150 |
| 6,920,482 B1 | * | 7/2005 | Fujiyoshi | 709/206 |
| 2002/0003535 A1 | * | 1/2002 | Cho | 345/204 |
| 2002/0026482 A1 | * | 2/2002 | Morishige et al. | 709/206 |
| 2002/0038343 A1 | * | 3/2002 | Masera | 709/203 |
| 2002/0052961 A1 | * | 5/2002 | Yoshimine et al. | 709/226 |

FOREIGN PATENT DOCUMENTS

| | | |
|---|---|---|
| JP | 10-154110 | 6/1998 |
| JP | 11-69002 | 3/1999 |
| JP | 2001-5751 | 1/2001 |

* cited by examiner

*Primary Examiner*—George C Neurauter, Jr.
*Assistant Examiner*—Mark D Fearer
(74) *Attorney, Agent, or Firm*—Oblon, Spivak, McClelland, Maier & Neustadt, L.L.P.

(57) ABSTRACT

A display displays a capture mode displaying source image data and a send mode displaying processed image data, which is to be sent. The display simultaneously displays, upon a switch from the capture mode to the send mode, the processed image data and a manipulation. The manipulation includes pixel values of the source image data and dummy values. An input inputs an address of a terminal to which the processed image data is to be transmitted. A transmitter transmits an address of a terminal together with the processed image data over a network to a server such that the server executes a processing for providing the processed image data to the terminal. An image data processor determines an image processing capacity of the terminal and converts an image size of the source image data such that the processed image data is commensurate with the image processing capacity of the terminal.

20 Claims, 21 Drawing Sheets

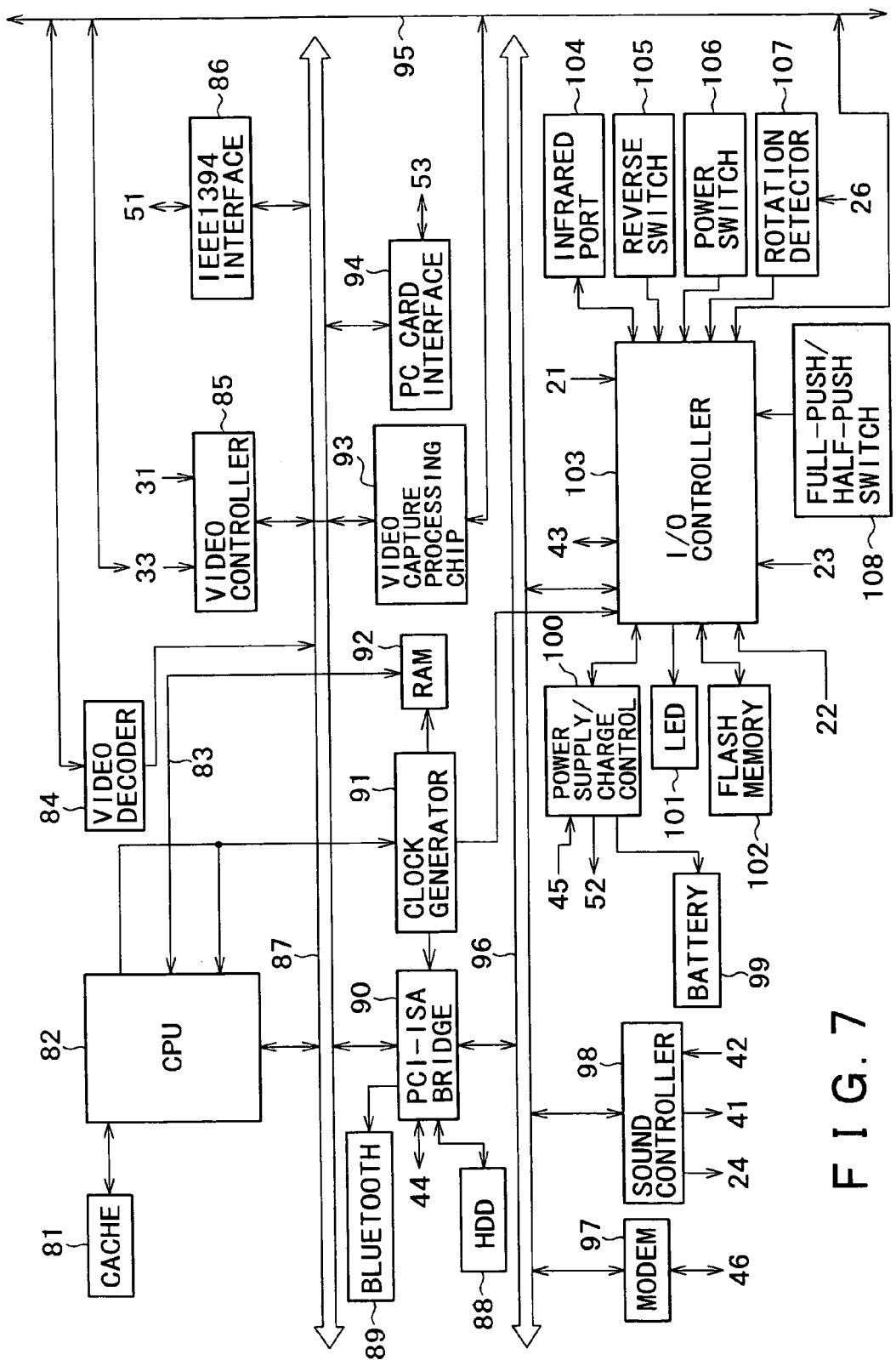
F I G. 7

F I G. 1 1

| | LIGHTED STATE | MODE | SCREEN |
|---|---|---|---|
| A | ●CAPTURE ○SEND | CAPTURE MODE | DISPLAYS NORMAL SCREEN ON FINDER |
| B | ○CAPTURE ●SEND | SEND MODE | DISPLAYS MANIPULATED IMAGE ON FINDER DISPLAYS SEND IMAGE IN VIEW AREA |
| C | ○CAPTURE ●SEND | SEND MODE | DISPLAYS MANIPULATED IMAGE ON FINDER DISPLAYS SEND IMAGE IN VIEW AREA TRANSMITS SEND IMAGE IN VIEW AREA |

207
208

INFORMATION PROCESSING APPARATUS AND PROGRAM FOR PROVIDING IMAGE DATA TO A TERMINAL

TECHNICAL FIELD

The present invention relates generally to an information processing apparatus and a program and, more particularly, to an information processing apparatus and a program which are adapted to transmit addresses along with content to a server and request this server for the provision of content to terminals having these addresses.

BACKGROUND ART

For example, a content providing system has been developed in which content is supplied from a user terminal to a server via a network to be stored in the server for another user terminal to get the stored content.

However, such a content providing system presents a problem that another terminal to which the content is eventually supplied must be notified of getting the content from the server for example, thereby complicating a user procedure.

DISCLOSURE OF INVENTION

It is therefore an object of the present invention to transmit content with the addresses of terminals to a server from which the content is to be supplied to these terminals by requesting the server thereof.

An information processing apparatus according to the present invention is characterized in that it includes: first input means for inputting the content; second input means for inputting an address of the terminal; and requesting means for transmitting the address of the terminal along with the content to the server to request the server for providing the content to the terminal.

The information processing apparatus according to the present invention may further include third input means for inputting login information necessary for logging in the server, and the second input means may input the address of the terminal after the server has been authenticated by inputting the login information.

A program according to the present invention is characterized in that it causes a computer to execute: a first input controlling step for inputting the content; a second input controlling step for inputting an address of the terminal; and a request controlling step for transmitting the address of the terminal along with the content to the server to request the server for providing the content to the terminal.

In the information processing apparatus and the program according to the invention, content is inputted, the address of a terminal is inputted, and the content and the address are transmitted to a server together. Consequently, the user can request the server for providing content to the terminal.

It should be noted that the present invention may also be practiced by the provision of an image processing method for the image processing apparatus according to the invention and a non-transitory recording medium recording the program of the present invention.

BRIEF DESCRIPTION OF DRAWINGS

FIG. 7 is a block diagram illustrating an exemplary internal configuration of the personal computer of FIG. 1.

FIG. 11 illustrates a method of operating a capture button and a send button.

BEST MODE FOR CARRYING OUT THE INVENTION

Figure 1:
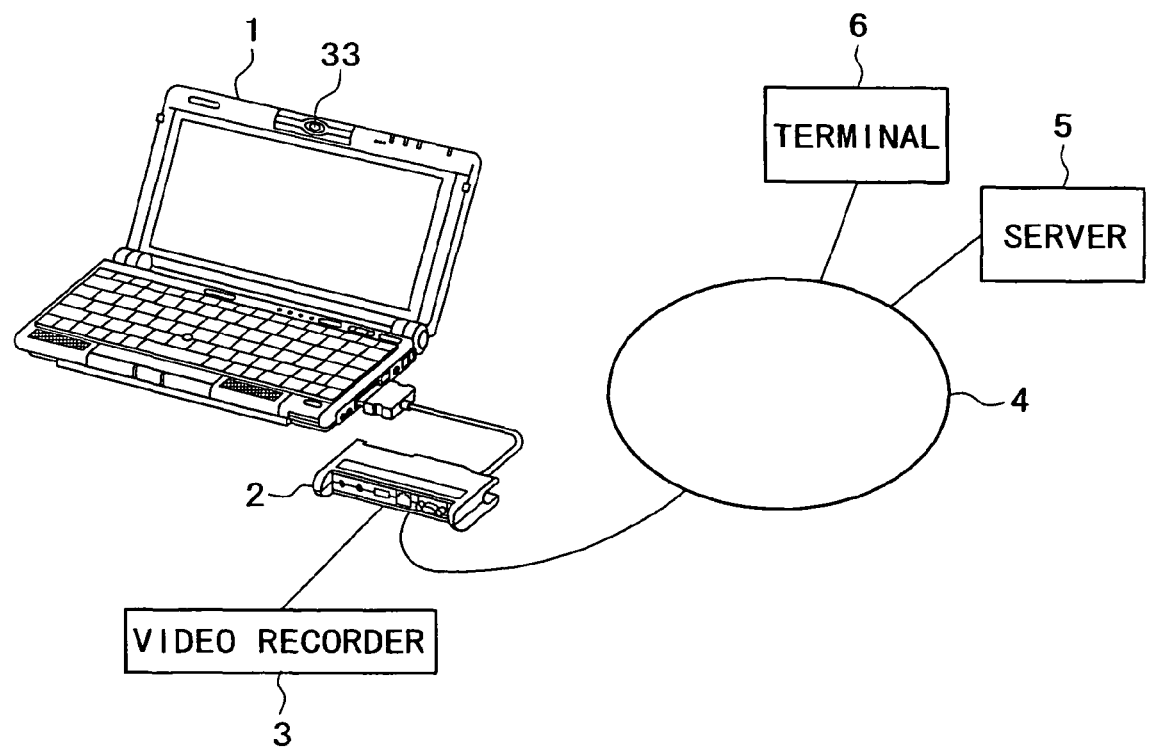
FIG. 1 illustrates a usage example of a personal computer 1 to which the present invention is applied.
Figure 2:
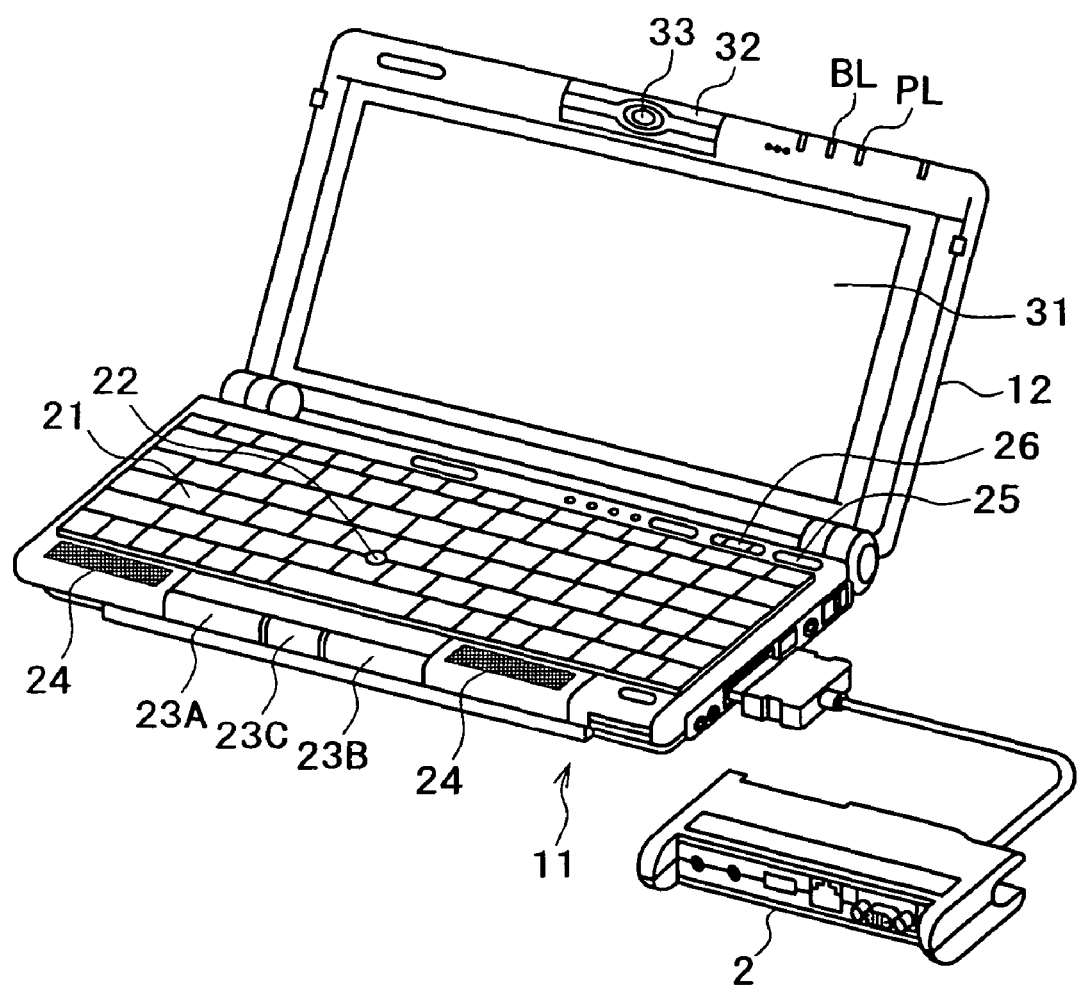
FIG. 2 illustrates an exemplary configuration of the external view of the personal computer of FIG. 1.

Now, referring to FIG. 1, there is shown a usage example of a personal computer 1 to which the present invention is applied.

A personal computer 1 may execute the capture mode processing in a predetermined image processing program to display, on a capture mode screen, an image (still image or moving image) taken by an incorporated CCD (Charge Coupled Device) video camera 33 or an image inputted from a video recorder 3 via a port replicator 2. It should be noted that, in what follows, an image taken by the CCD video camera 33 and an image inputted from the video recorder 3 for example, which are displayed on the capture mode screen, will be appropriately referred to as presentation images.

The personal computer 1 may execute the send mode processing in an image processing program to connect to a network 4 via the port replicator 2, thereby transmitting the images supplied from the CCD video camera 33 and the video recorder 3 to the server 5. At this moment, the user of the personal computer 1 displays images on the send mode screen to select the image to be transmitted to the server 5. It should be noted that, in what follows, each image to be transmitted to the server 5 will be appropriately referred to as a send image.

The server 5 manages the images transmitted from the personal computer 1 for example and provides (or transfers) any of these images to the terminal 6 for example which requests them.

The following outlines the functionality of the personal computer 1. The personal computer 1 displays a screen for the capture mode (hereafter referred to as a capture mode screen) (FIG. 8) during the execution of capture mode processing, which will be detailed later, and displays a screen for the sending mode (hereafter referred to as a send mode screen) (FIG. 10) during the execution of the send mode processing.

Figure 8:
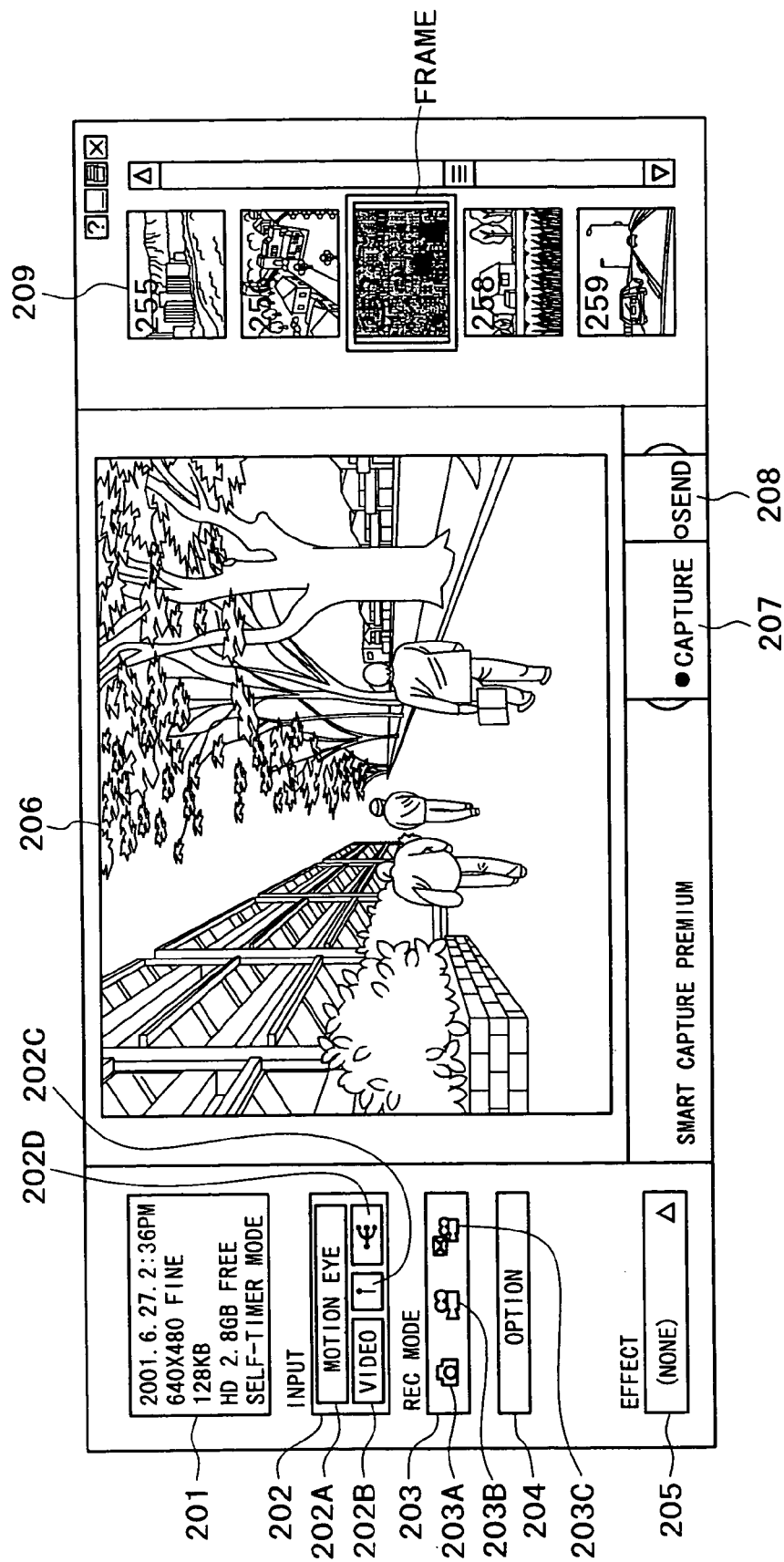
FIG. 8 illustrates an example of capture mode screen.

On the capture mode screen, an image taken by the CCD video camera 33 or an image inputted from the video recorder 3 is displayed (in a finder 206 shown in FIG. 8). On the other hand, a send image is displayed on the send mode screen (in a view area 222 shown in FIG. 10) and a presentation image (displayed in the finder 206 shown in FIG. 8) is displayed on the send mode screen as manipulated to the extent that its contents are recognizable (in the finder 206 shown in FIG. 10) (in the case of FIG. 10, the presentation image is displayed in a transparent manner). It should be noted that, in what follows, a presentation image before manipulation (the presentation image displayed on the capture mode screen) is appropriately referred to as a normal presentation image and a presentation image manipulated to the extent that its contents are recognizable (the presentation image displayed on the send mode screen) is appropriately referred to as a manipulated presentation image.

Namely, if the send mode processing is mainly performed (a send image is selected and transmitted), because of the difference between the display forms of presentation image and manipulated presentation image, the corresponding send image may easily be distinguished from the image corresponding to the capture mode processing not mainly performed (for example, the image being taken by the CCD video camera 33). At the same time, the image being taken by the CCD video camera 33 may be grasped.

As described above, the personal computer 1 may display an image taken by the CCD video camera 33 in the capture mode as well as an image inputted from the video recorder 3 via the port replicator 2.

Normally, the frame size of a video signal (digital) inputted form the CCD video camera 33 is 640 pixels×480 lines, but the frame size of a video signal (analog) inputted from the video recorder 3 is 720 pixels×480 lines, presenting a difference therebetween.

Therefore, the personal computer 1 eventually forms a frame of 640×480 from the video signal supplied from the video recorder 3 to display the image corresponding to the video signal from the video recorder 3 by the same size as that of the image corresponding to the video signal supplied from the CCD video camera 33.

Also, as described above, the personal computer 1 may input the video signal from the video recorder 3 to display the image corresponding to this signal; if a signal for disabling viewing for the purpose of copyright protection (hereafter referred to as a viewing disable signal) is superimposed on this video signal, the personal computer 1 may display the image corresponding to the viewing disable signal by attaching a predetermined effect which disables viewing.

In addition, the personal computer 1 may send, along with a send image, the address of the terminal 6 for example to the server 5, thereby causing the server 5 to execute the processing of providing the send image to the terminal 6.

The following describes the configurations of external views of the personal computer 1 and the port replicator 2 with reference to FIGS. 2 through 6.

The personal computer 1 (FIG. 2) is basically configured by a main body 11 and a display section 12 attached to the main body 11 in a pivotal manner.

The main body 11 has, on the outside thereof, a plurality of operator keys 21 for entering various letters, symbols, and numerals, a stick-type pointing device (hereafter referred to simply as a stick) 22 for moving the mouse cursor, a left click button 23A and a right click button 23B equivalent to the left button and the right button of an ordinary mouse, a center button 23C for operating the scroll bar without pointing the mouse cursor to the scroll button, an incorporated speaker 24, and a shutter button 25 for the CCD video camera 33 arranged on the display section 12.

Figure 3:
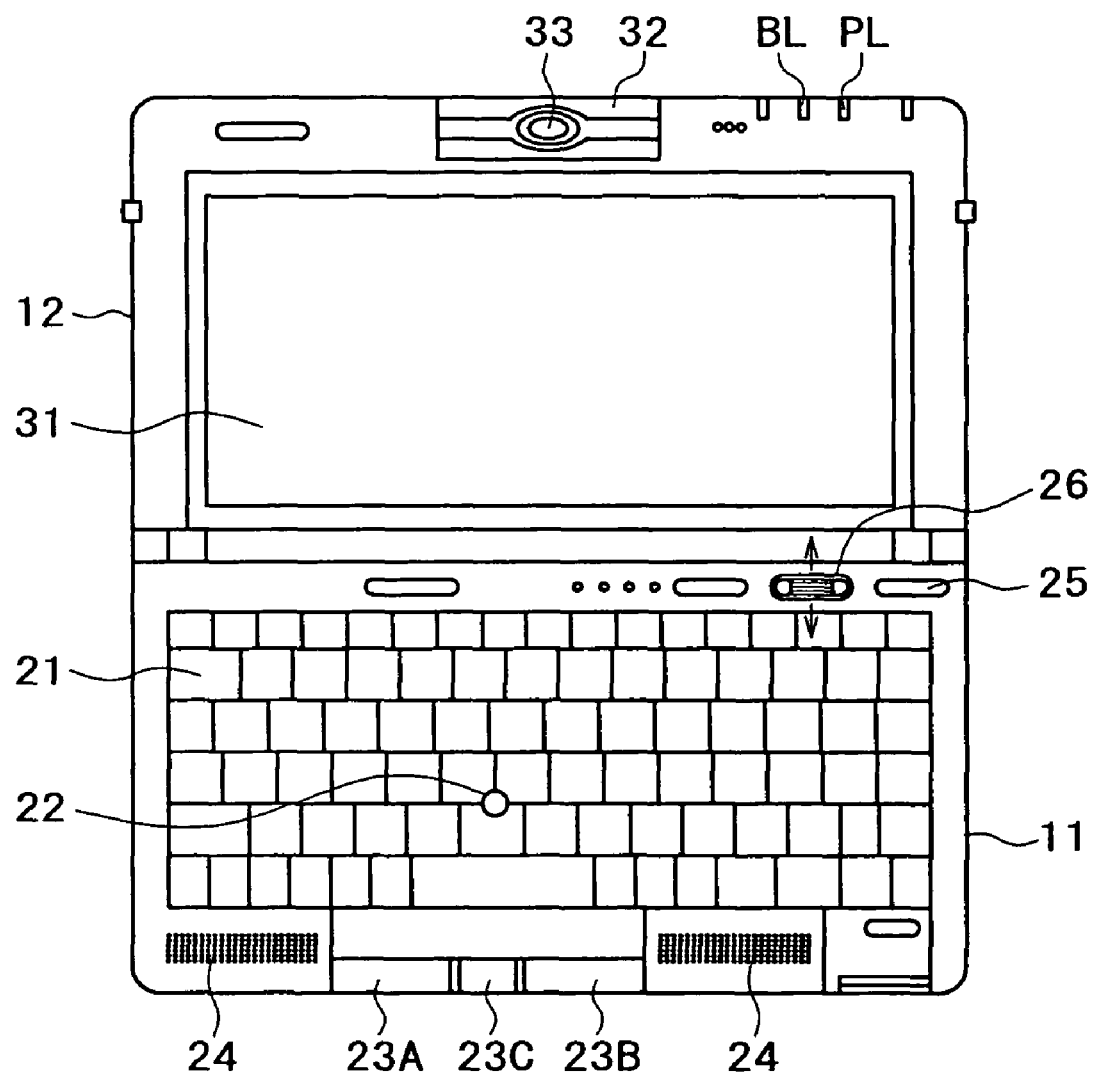
FIG. 3 illustrates another exemplary configuration of the external view of the personal computer of FIG. 1.

The main body 11 also has a jog dial 26 on the upper right corner thereof as shown in the top view (FIG. 3) of the main body 11. The jog dial 26 is rotated in the arrow direction (up and down direction) as shown in FIG. 3 and pressed in the vertical direction.

It should be noted that the position of the jog dial 26 and the rotational direction in its rotational operation correspond to the position and operational direction of a file list 209 (to be described later) which is displayed in each of the capture mode screen and the send mode screen displayed on an LCD 31.

The display section 12 has, on the front thereof, the LCD (Liquid Crystal Display) 31 and, on the front upper portion thereof, an image capture section 32 having the CCD video camera 33 in a pivotal manner relative to the display section 12.

Namely, the image capture section 32 pivotally moves within an angular range of 180 degrees between the front direction and rear direction of the display section 12, thereby being positioned at any place within that range.

Figure 4:
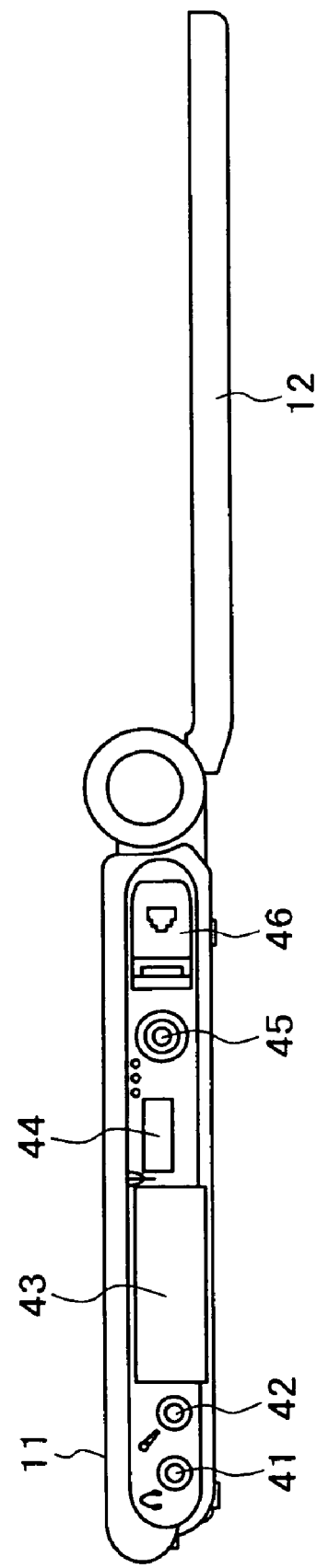
FIG. 4 illustrates still another exemplary configuration of the external view of the personal computer of FIG. 1.

On the right side of the main body 11, a headphone connector 41, a microphone connector 42, an I/O connector 43, a USB (Universal Serial Bus) connector 44, a DC IN connector 45 which is connected to a power receptacle through an AC adaptor, and a modular jack 46 which is connected to the telephone line are arranged as shown in FIG. 4. In this example, the port replicator 2 is connected to the I/O connector 43.

Figure 5:
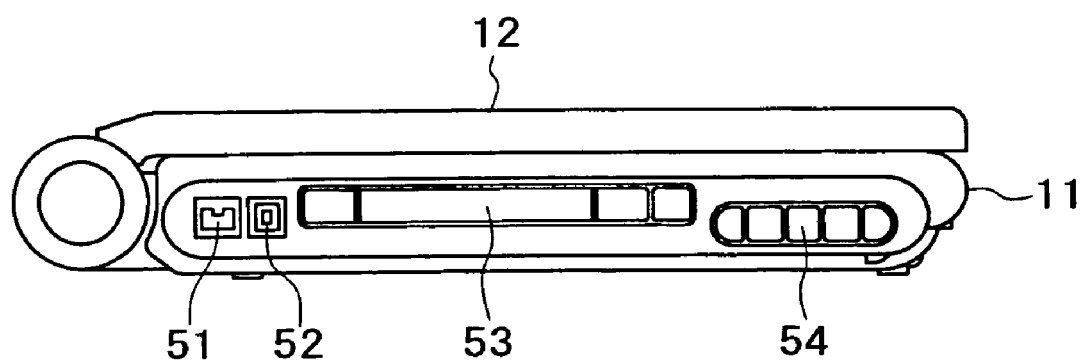
FIG. 5 illustrates yet another exemplary configuration of the external view of the personal computer of FIG. 1.

On the left side of the main body 11, an IEEE (Institute of Electrical and Electronics Engineers) 1394 connector 51 and a DC OUT connector 52 are arranged in a predetermined positional relation as shown in FIG. 5.

Namely, the personal computer 1 may be connected to electronic equipment (not shown) having the IEEE 1394 connector and the DC IN connector arranged in the same positional relation as above with a predetermined cable having connecting portions corresponding to these connectors to perform communication based on the IEEE 1394 standard and supply DC power to the connected electronic equipment.

On the left side of the main body 11, a PC card slot 53 for PC (Personal Computer) cards having the PCMCIA (Personal Computer Memory Card International Association) standard and an air vent 54 are also arranged.

Figure 6:
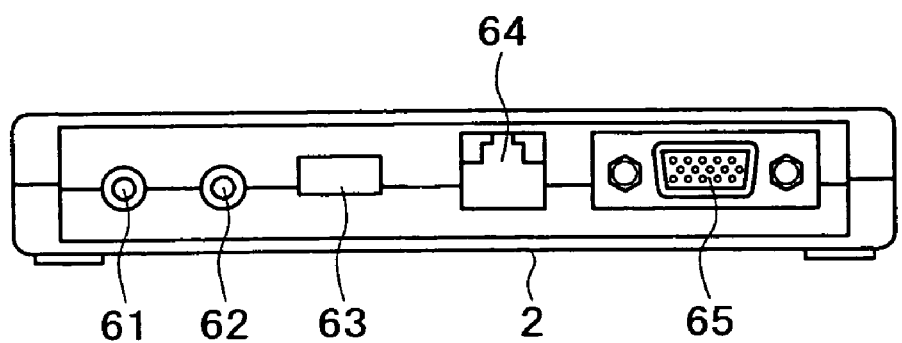
FIG. 6 illustrates an exemplary configuration of the external view of a port replicator of FIG. 1.

FIG. 6 shows a connector arrangement of the port replicator 2. The port replicator 2 has an AV IN 61 which is connected to the video recorder 3 for entering AV signals (audio signal and video signal) (analog) therefrom and an AV OUT connector 62 which is connected to a television receiver, a video deck, an active speaker, or an amplifier (none shown) for outputting AV signals (analog) therefrom.

The port replicator 2 also has a USB connector 63, a network connector 64 to be connected to a network compliant with 10BASE-T or 100BASE-T (both trademark), and a monitor connector 65 to be connected to an external display device. In this example, the network connector 64 is connected to the network 4.

FIG. 7 shows an exemplary internal configuration of the personal computer 1. In the main body 11 of the personal computer 1, a CPU (Central Processing Unit) 82 for totally controlling each function in the main body 11 is connected to a RAM (Random Access Memory) 92 via a memory bus 83 to execute processing corresponding to various programs (for example, image processing programs) loaded in the RAM 92 on the basis of the system clock provided by a clock generator 91 at a predetermined operating speed.

A cache memory 81 caches data for use by the CPU 82, thereby realizing high-speed access operations.

The CPU 82 is connected to a PCI (Peripheral Component Interconnect) bus 87. The PCI bus 87 is connected to a video decoder 84, a video controller 85, an IEEE 1394 interface 86, a PCI-ISA bridge 90, a video capture processing chip 93, and a PC card interface 94, in addition to the CPU 82.

The video capture processing chip 93 is connected to an $I^2C$ bus 95 (generally referred to an SM (System Management) bus). When the image data captured by the CCD video camera 33 are supplied via the $I^2C$ bus, the video capture processing chip 93 temporarily stores the received image data into an incorporated frame memory (not shown) and performs image compression processing on the image data on the basis of the JPEG (Joint Photographic Experts Group) standard or the MPEG (Moving Picture Experts Group) 1 or 2 standard to generate image data and then stores the generated image data into the frame memory (640 pixels×480 lines) again.

In response to a request from the CPU 82, the video capture processing chip 93 directly transfers the image data from the frame memory to the RAM 92 by use of the bus master function and then transfers the image data to a hard disk drive (HDD) 88 as still-image data or moving-image data.

A video signal (an analog signal) from the video recorder 3 for example which is inputted from the port replicator 2 connected to the I/O connector 43 is inputted in the video decoder 84 via an I/O controller 103 and the $I^2C$ bus 95. The video decoder 84 decodes the received video signal and temporarily stores the resultant video signal into a frame memory (not shown) (720 pixels×480 lines).

In response to a request from the CPU 82, the video decoder 84 directly transfers the image data from the frame memory to the RAM 92 by use of the bus master function and then transfers the image data to the HDD 88 as still-image data or moving-image data.

The video controller 85 performs predetermined graphics processing on the image data obtained as a result of the capturing by the CCD video camera 33, the image data from the video capture processing chip 93, or the image data from the video decoder 84, stores these data into an internal VRAM (Video Random Access Memory), reads the stored image data appropriately, and displays the read image data on the LCD 31.

In addition, the video controller 85 is adapted to output the image data based on the processing (in the capture mode or the send mode) by the CPU 82 supplied appropriately to the LCD 31 to display a plurality of window screens.

The PC card interface 94 is adapted so that a PC card is appropriately loaded in a PC card slot 53 when adding optional capabilities and the PC card interface 94 is connected to external devices such as a CD-ROM drive and DVD drive via the loaded PC card.

The IEEE 1394 interface 86 is directly connected to the IEEE 1394 connector 51 to be connected to external devices such as another computer device and a digital video camera via the IEEE 1394 connector 51.

The PCI bus 87 is connected to an ISA (Industrial Standard Architecture) bus 96 via a CPI-ISA bridge 90 to which the HDD 88, the Bluetooth 89, and the USB connector 44 are connected.

The PCI-ISA bridge 90 is configured by an IDE (Integrated Drive Electronics) interface, a configuration register, an RTC (Real-Time Clock) circuit and a USB interface to control the HDD 88 via the IDE interface on the basis of the system clock supplied from the clock generator 91.

The hard disk of the HDD 88 stores an OS (Operating System) such as Windows (R) XP, an electronic mail program, an auto pilot program, a jog dial utility program, a jog dial driver, a capture software, an image processing program, and other various application software programs, which are appropriately transferred to the RAM 92 in the course of startup processing.

The PCI-ISA bridge 90 controls, via the USB interface, external devices such as a floppy (trademark) disk drive, a printer, and a USB mouse for example connected via the USB connector 44 and, at the same time, controls a modem 97 and a sound controller 98 connected to the ISA bus 96.

The modem 97 is connected to an Internet service provider (hereafter referred to as a provider) via a public telephone line and the Internet (not shown) through the modular jack 46 to make access with the provider. The sound controller 98 captures a voice signal from the microphone via the microphone connector 42 and supplies a voice signal to the incorporated speaker 24 and the headphone connector 41.

The I/O (In/Out) controller 103 is connected to the ISA bus 96. The I/O controller 103 receives power from the DC IN connector 45 via a power supply/charge controller 100 to supply power to each circuit when a power switch 106 is turned on. It should be noted that the I/O controller 103 operates on the system clock supplied from the clock generator 91 also.

The power supply/charge controller 100 is controlled by the I/O controller 103 to control the charging of a battery pack 99 connected to the battery connector and, at the same time, supplies power to external electronic equipment via the DC OUT connector 52.

The I/O controller 103 is configured by a microcontroller, an I/O interface, a CPU, a ROM, a RAM, and so on and controls the data input/output operation between the OS and application software, and the various peripheral devices such as the LCD 31 and the HDD 88 on the basis of the BIOS (Basic Input/Output System) stored in a flash memory 102.

In addition, the I/O controller 103 is connected to an infrared port 104 to execute infrared communication with another computer device for example. Further, the I/O controller 103 is connected to a reverse switch 105, which is turned on when the image capture section 32 of the CCD video camera 33 is rotated 180 degrees in the rear direction of the LCD 31, notifying the CPU 82 thereof through the PCI-ISA bridge 90.

Moreover, the I/O controller 103 is connected to a full-push/half-push switch 108, which is turned on when the shutter button 25 arranged on top of the main body 11 is half-pushed, notifying the CPU 82 thereof, and turned on when the shutter button 25 is fully pushed, notifying the CPU 82 thereof.

Namely, when the shutter button 25 is half-pushed by the user with the capture software loaded in the RAM 92 from the hard disk of the HDD 88, the CPU 82 enters the still-image mode and controls the CCD video camera 33 to execute the freezing of the still image; when the shutter button is fully pushed, the CPU 82 captures the frozen still image to send it to the video controller 85.

On the contrary, when the shutter button 25 is fully pushed by the user with the capture software not loaded, the CPU 82 enters the moving-picture mode and captures the moving image to send it to the video controller 85.

Meanwhile, the ROM of the I/O controller 103 stores various control programs including a wakeup program, a key input monitor program, a LED control program, and jog dial status monitor program.

The jog dial status monitor program is a program associated with a jog dial utility program stored in the hard disk of the HDD 88, which monitors whether or not the rotary encoder section of the jog dial 26 has been rotated or pushed.

The wakeup program is controlled by the CPU 82 such that, when the current time supplied from the RTC circuit of the PCI-ISA bridge 90 reaches a preset start time, the wakeup program executes predetermined processing. The key input monitor program monitors the inputting of the operator keys 21 and other various key switches.

The LED control program controls the turning on/off of various lights constituted by LEDs (Light Emitting Diodes) 101 including a power light PL, a battery light BL, a message light ML.

The RAM of the I/O controller 103 has various program registers including a set time register for the wakeup program, a key input monitor register for the key input monitor program, a LED control register for the LED control program, and an I/O register for the jog dial status monitor program.

The set time register is adapted to store the time information about the start time set by the user as desired beforehand for use by the wakeup program. Therefore, on the basis of the wakeup program, the I/O controller 103 determines whether or not the current time supplied by the RTC circuit has reached the start time set by the user as desired. If the current time is found reaching the start time, the I/O controller 103 notifies the CPU 82 thereof. Consequently, the CPU 82 starts up the predetermined preset application software at the start time, thereby executing the predetermined processing in accordance with this application software.

The key input monitor register is adapted to store operation key flags on the basis of the inputting from the operator keys 21, stick 22, left click button 23A, the right click button 23B, and the center button 23C.

Consequently, the I/O controller 103 determines on the basis of the key input monitor program and the state of the operation key flag whether or not a pointing operation by the stick 22 or a click operation by the left click button 23A, the right click button 23B or the center button 23C for example has been performed. If a pointing operation or a click operation is found performed, the I/O controller 103 notifies the CPU 82 thereof.

A pointing operation herein denotes an operation for moving the mouse cursor to a desired position by pushing the stick 22 horizontally or vertically with the finger. A click operation herein denotes an operation of depressing the left click button 23A or right click button 23B with the finger quickly, and then releasing the finger from the button.

In response to any of these operations, the CPU 82 executes the predetermined processing according to the click operation.

The LED control register is adapted to store the turn on/off flags indicative of the turn on/off of various lights formed by LEDs including the power light PL, the battery light BL, and the message light ML.

Consequently, when the CPU 82 loads the electronic mail program from the hard disk of the HDD 88 into the RAM 92 upon pushing of the jog dial 26, thereby receiving electronic mail in accordance with the electronic mail program, the I/O controller 103 stores the turn on/off flag and controls the LEDs 101 to turn on the message light ML on the basis of the stored turn on/off flag.

The I/O register for the jog dial status monitor program is adapted to store a rotary operation flag and a pushing operation flag for a rotary operation and a pushing operation performed with the jog dial 26 respectively.

Consequently, when a menu item desired by the user is selected from a plurality of menu items by a rotary operation and a pushing operation of the jog dial 26 via the rotation detector 107, the I/O controller 103 stores the rotary operation flag and the pushing operation flag into the I/O register and notifies the CPU 82 thereof.

In response, in accordance with the jog dial utility program loaded from the HDD 88 and starting up in the RAM 92, the CPU 82 starts up the application software corresponding to the menu item selected by the rotation and pushing operations of the jog dial 26, executing predetermined processing.

Here, if the OS is not started up with the power switch 106 being off, the I/O controller 103 is always operating by being supported by the jog dial status monitor program under the control of the power supply/charge controller 100, thereby starting up user-desired application software and script files upon pushing of the jog dial 26 without arranging a dedicated key in the power save state or power off state.

Meanwhile, the I/O controller 103 is connected to the I$^2$C bus 95 and supplies, via the I$^2$C bus 95, various setting parameters for the CCD video camera 33 set by the operator keys 21 and the jog dial 26, thereby controlling the camera power turn on/off in the CCD video camera 33 and adjusting the brightness and contrast in the CCD video camera 33.

The following describes the details of the operation of the personal computer 1. Referring to FIG. 8, there is shown an example of a screen (a capture mode screen) which is displayed in the capture mode.

At the center of the screen, the finder 206 is arranged in which an image taken by the CCD video camera 33 or supplied from a device (in this example, the video recorder 3) connected to the AV IN connector 61 (FIG. 6) or a device connected to the USB connector 44 (FIG. 4) or the USB connector 63 (FIG. 6).

In an image information display section 201 shown in the upper left portion of the capture mode screen, the information associated with the image shown in the finder 206 is displayed.

Below the image information display section 201, an input device specification section 202 is arranged which is composed of buttons to be operated for specifying a device from which an image to be displayed in the finder 206 is supplied. By specifying the CCD video camera 33 by operating a button 202A of the input device specification section 202, the user can display an image inputted from the CCD video camera 33.

By operating a button 202B to specify a device (in this example, the video recorder 3) (in what follows, the device connected to the AV IN connector 61 is appropriately referred to as an analog AV input device) connected to the AV IN connector 61 (FIG. 6), the user can display an image inputted from the analog AV input device. In addition, by operating a button 202C to specify a device connected to the IEEE 1394 connector 51 (FIG. 5) (in what follows, the device connected to the IEEE 1394 connector 51 is appropriately referred to as a digital AV input device), the user can display an image inputted from the digital AV input device.

Further, by operating a button 202D to specify a device to be connected to the USB connector 44 (FIG. 4) or the USB connector 63 (FIG. 6) (in what follows, the device connected to the USB connector 44 or the USB connector 63 is appropriately referred to as a USB device), the user can display an image inputted from the USB device.

In a capture mode specification section 203 below the input device specification section 202, a button for switching the capture mode of the CCD video camera 33, a button for setting the display mode of an image supplied from the device specified by the input device specification section 202, and so on are arranged.

A button 203A is operated to capture a still image by the CCD video camera 33. A button 203B is operated to display, in high quality (to display an image in movie for a long time), an image taken by the CCD video camera 33 or inputted from an analog AV input device.

A button 203C is operated to display an image taken by the CCD video camera 33, inputted from a digital AV input device, or inputted from a USB device in a quality lower than that of long-time movie but with a smaller data amount than that of long-time movie (namely, to display the above-mentioned image in network movie).

Below the capture mode specification section 203, an option button 204 and an effect button 205 are arranged. The option button 204 is operated to perform a predetermined setting operation and the effect button 205 is operated to add an effect to an image to be displayed in the finder 206.

Below the finder 206, a capture button 207 and a send button 208 each having a light are arranged. It should be noted that, in the initial state of the capture mode screen, the light of the capture button 207 is on and the light of the send button 208 is off.

By operating the capture button 207 with its light being on, the user can start displaying an image in the finder 206. By operating the send button 208 with its light being off, the user can switch from the capture mode to the send mode.

It should be noted that, in the capture mode, pushing the jog dial 26 also switches from the capture mode to the send mode.

A file list 209 arranged on the right side of the capture mode screen displays, in a list form, the thumbnails of images recorded to the HDD 88 for example. Each thumbnail also displays the information about the image.

Figure 9:
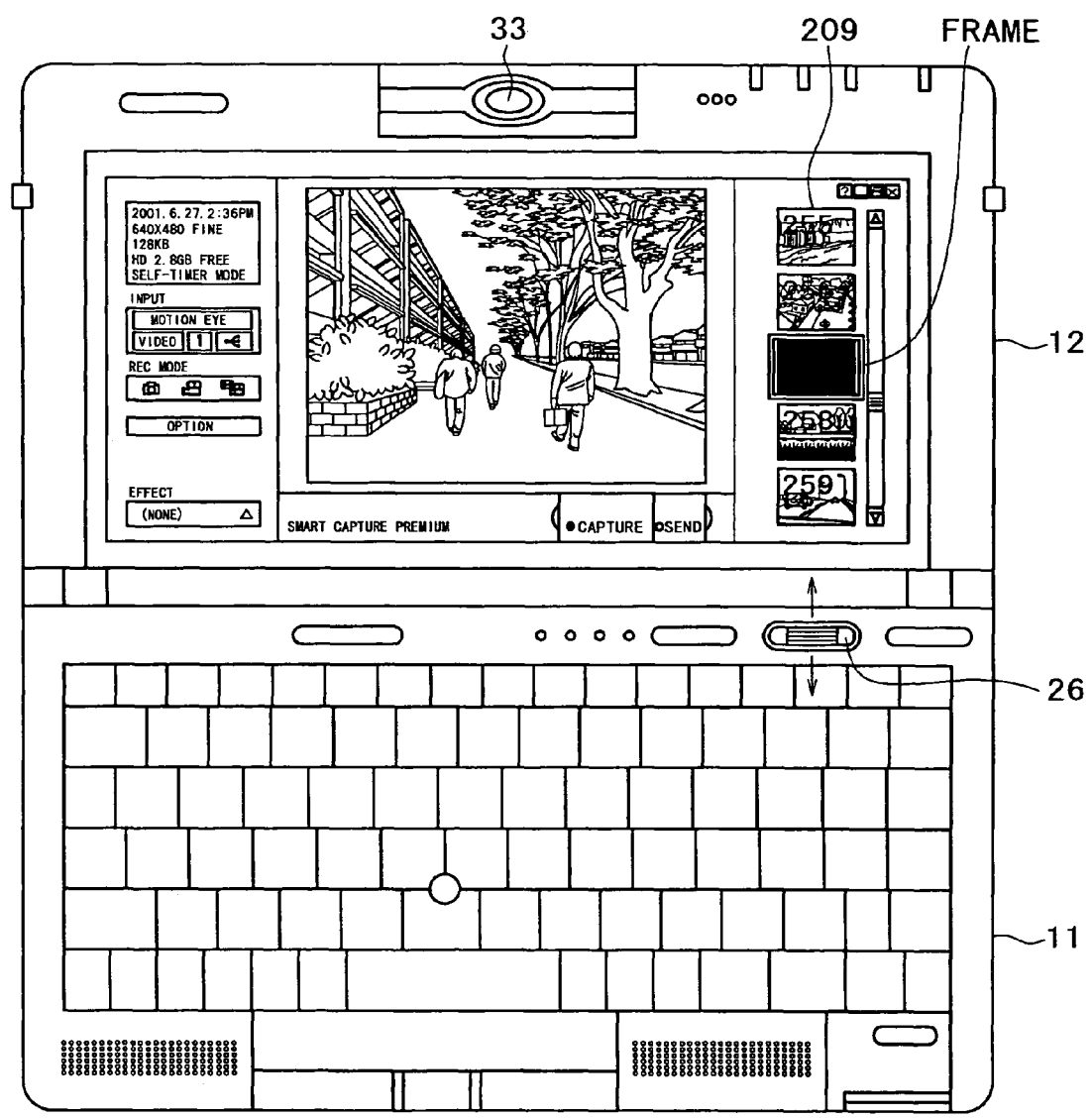
FIG. 9 illustrates a positional relationship between jog dial and file list.

The file list 209 is displayed at a position corresponding to the position of the jog dial 26 as shown in FIG. 9. The frame enclosing a thumbnail in the file list 209 may be moved along the file list 209 as the jog dial 26 is rotated.

To be more specific, when the jog dial 26 is rotated in the up-arrow direction in FIG. 9, the frame moves upward by the amount of rotation. If the jog dial 26 is rotated further upward with the frame enclosing the top thumbnail, all displayed thumbnails are moved upward. Namely, the top thumbnail disappears and a new thumbnail comes appearing at the bottom. That is, the frame of the file list 209 moves in response to the rotary direction of the jog dial 26.

Figure 10:
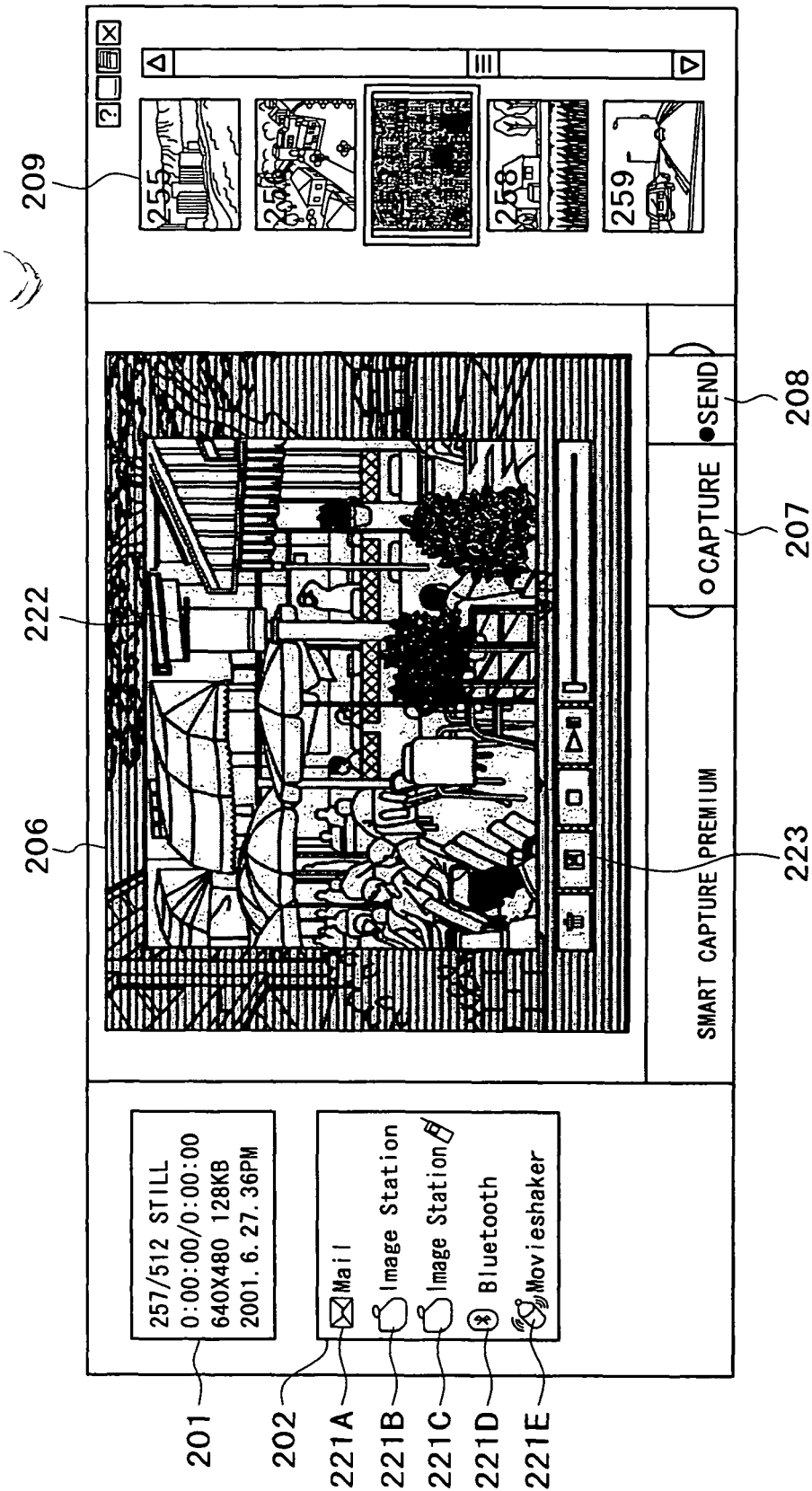
FIG. 10 illustrates an example of send mode screen.

FIG. 10 shows an exemplary screen (send mode screen) to be displayed in the send mode. In this screen, a view area 222 smaller than the finder 206 is arranged in front of the finder 206. In addition, a send form specification section 221 instead of the input device specification section 202, capture mode specification section 203, option button 204, and the effect button 205 of the capture mode screen is arranged in this screen. The image information display section 201, the capture button 207, the send button 208, and the file list 209 are displayed in the same manner as the capture mode screen.

The view area 222 displays the image of a thumbnail which corresponds to the frame of the file list 209.

At this moment, the finder 206 displays an image (presentation image) currently inputted from a device specified by the input device specification section 202 such that it is manipulated to a degree that its contents are recognizable (manipulated presentation image (in this case, a transparent presentation image)).

In the send form specification section 221, buttons to be operated for specifying send modes in which the send image displayed in the view area 222 is transmitted.

A button 221A is operated to send mail attached with a still image or network movie. A button 211B is operated to send a still image or a network movie to the server 5. A button 221C is operated to send a still image to another terminal (for example, the terminal 6) via the server 5. A button 221D is operated to send a still image to a terminal connected to the Bluetooth. Button 221E is operated to edit a moving image (to be more specific, this button is operated to supply a moving image to an editing program). It should be noted that the operation of the personal computer 1 to be executed when the button 221C is operated will be described later.

Below the view area 222, an operator section 223 is arranged in which various buttons to be operated when the image displayed in the view area 222 is manipulated.

Below the finder 206, the capture button 207 with its light off and the send button 208 with its light on are displayed. By operating the send button 208 with its light on, the user can send the image displayed in the view area 222 in the form specified by the send form specification section 221.

By operating the capture button 207 with its light off, the user can switch from the send mode to the capture mode. It should be noted that, in the send mode, pushing the jog dial 26 may also switch from the send mode to the capture mode.

The following describes together the effects of the operations of the capture button 207 and the send button 208 in the capture mode and the send mode, with reference to FIG. 11.

As shown in A of FIG. 11, when the send button 208 is operated in the capture mode (the light of the capture button 207 is on and the light of the send button 208 is off), the capture mode is switched to the send mode as shown in B of FIG. 11 (the light of the capture button 207 goes off and the light of the send button 208 goes on). Namely, a manipulated presentation image is displayed instead of a normal presentation image in the finder 206 and the view area 222 is displayed with the thumbnail image enclosed by the frame in the file list 209 for example.

When the send button is further operated in the send mode (the light of the capture button 207 is off and the light of the send button 208 is on), the send image displayed in the view area 222 is transmitted in the form specified by the send form specification section 221 as shown in C of FIG. 11.

The following describes the operations of the CPU 82 and the video controller 85 of the personal computer 1 to be executed when displaying a manipulated presentation image in the finder 206 when the capture mode is switched to the send mode. First, the operation of the CPU 82 will be described with reference to the flowchart shown in FIG. 12.

Figure 13:
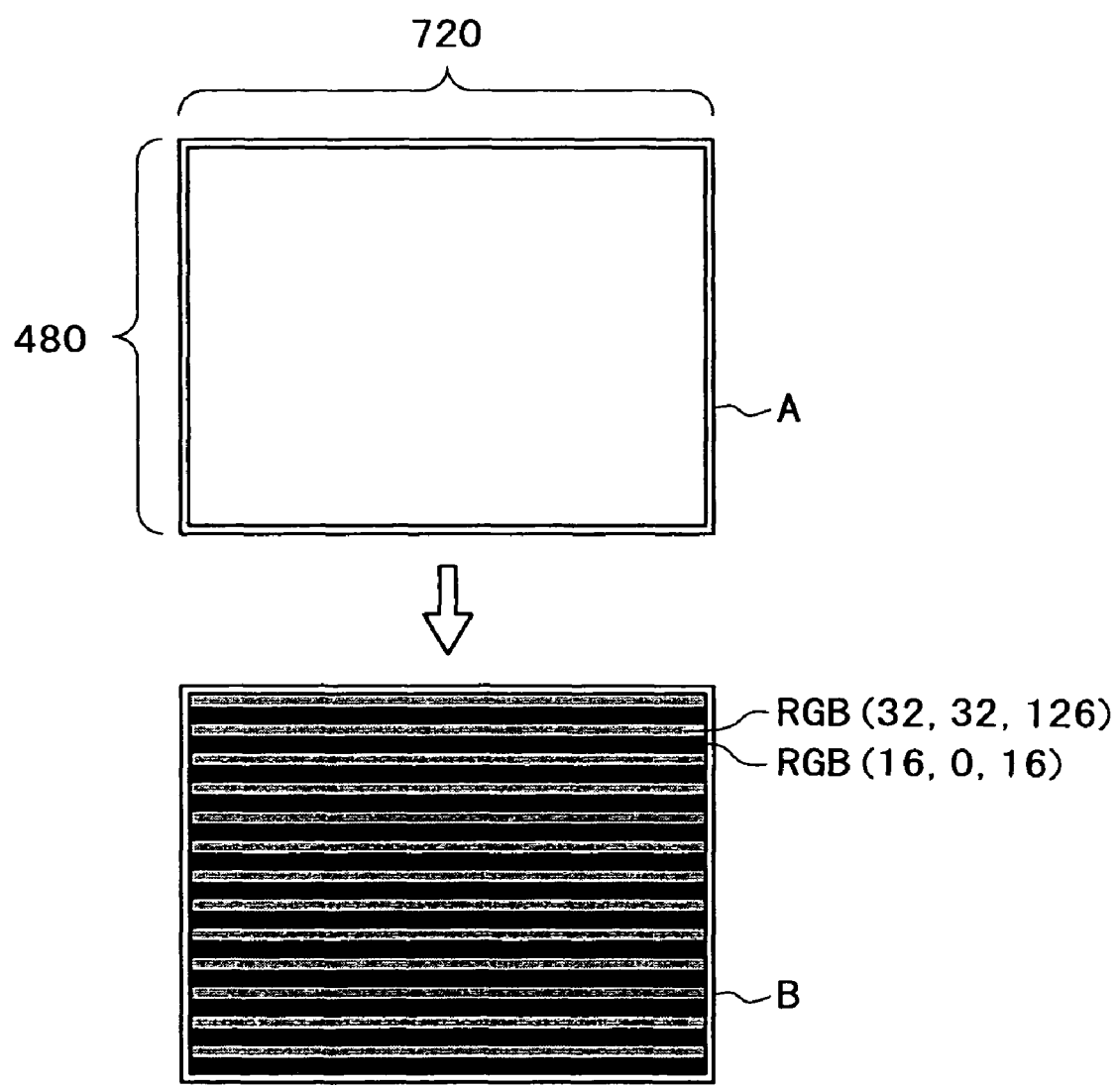
FIG. 13 illustrates the processing of displaying a manipulated presentation image.

In the capture mode, when a switching signal generated by operating the send button 208 or pushing the jog dial 26 for switching from the capture mode to the send mode is inputted in step S1, the CPU 82 notifies the video controller 85 thereof in step S2 and, at the same time, draws a frame of 640 pixels×480 lines into the VRAM of the video controller 85 as shown in A of FIG. 13.

Next, in step S3, the CPU 82 sets blue pixel values (RGB (32, 32, 126)) to the pixels of the even-numbered lines of the frame drawn in step S2 as shown in B of FIG. 13 and sets black pixel values (RGB(16, 0, 16)) to the pixels of the odd-numbered lines. It should be noted that the halftone lines in B of FIG. 13 are even-numbered lines while the black lines are odd-numbered lines; for the brevity of description, the width and the number of these lines are not the precise reflection of the actual lines.

Then, the above-mentioned procedure comes to an end.

Figure 14:
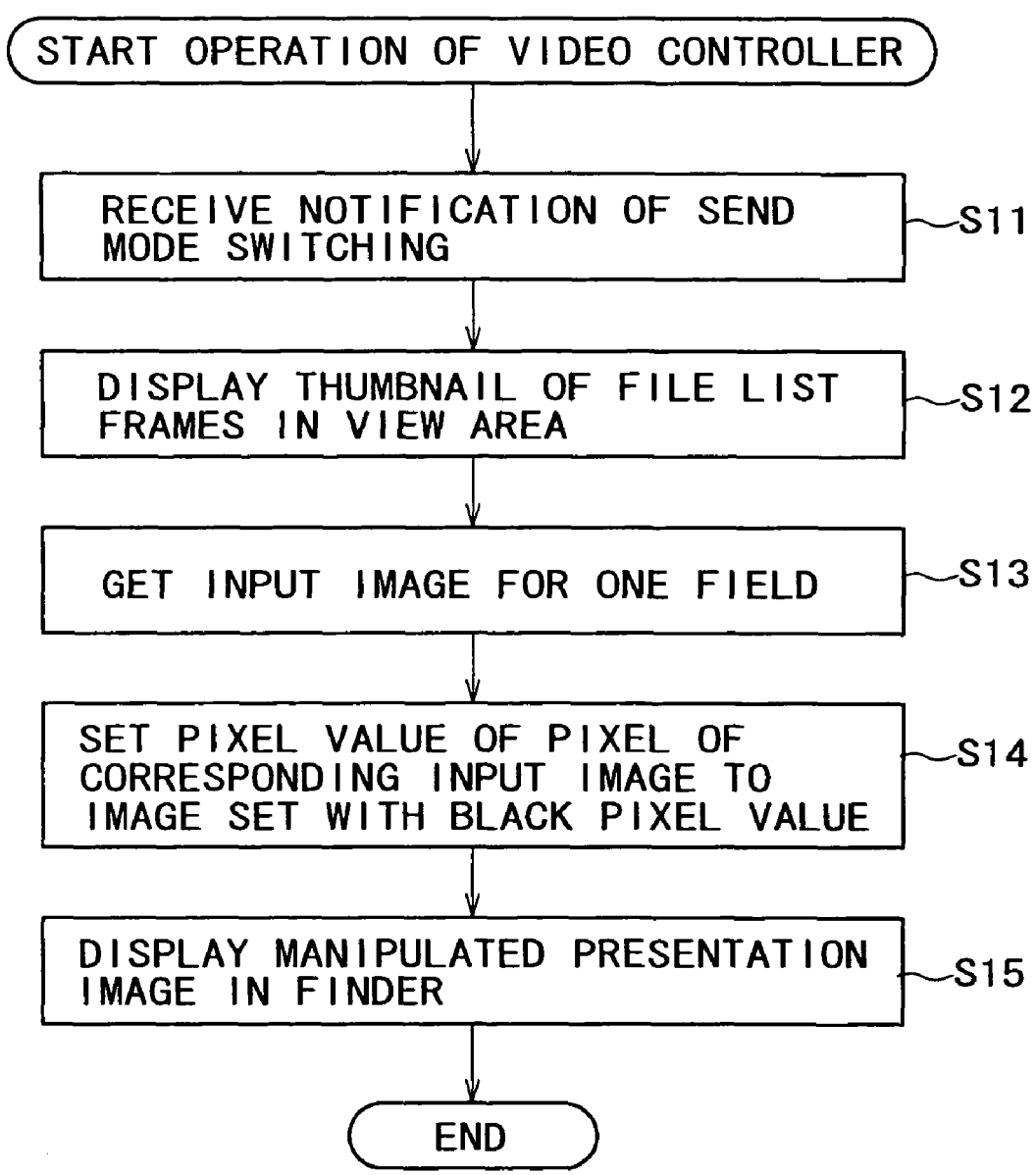
FIG. 14 is a flowchart describing the operation of a video controller of a personal computer for displaying a manipulated presentation image.

The following describes the operation of the video controller 85 with reference to the flowchart shown in FIG. 14. In step S11, receiving a notification that the switching to the send mode is requested by the CPU 82, then the video controller 85 executes the processing of displaying, in the view area 222, the image of the thumbnail enclosed by frame in the file list 209 and the processing of displaying other portions constituting the send mode screen in step S12.

Next, the video controller 85 generates a manipulated presentation image and displays it in the finder 206. First, in step S13, the video controller 85 starts the processing of retrieving, from the video decoder 84 or the video capture processing chip 93, the image data for one field inputted from a device specified by the input device specification section 202.

Figure 12:
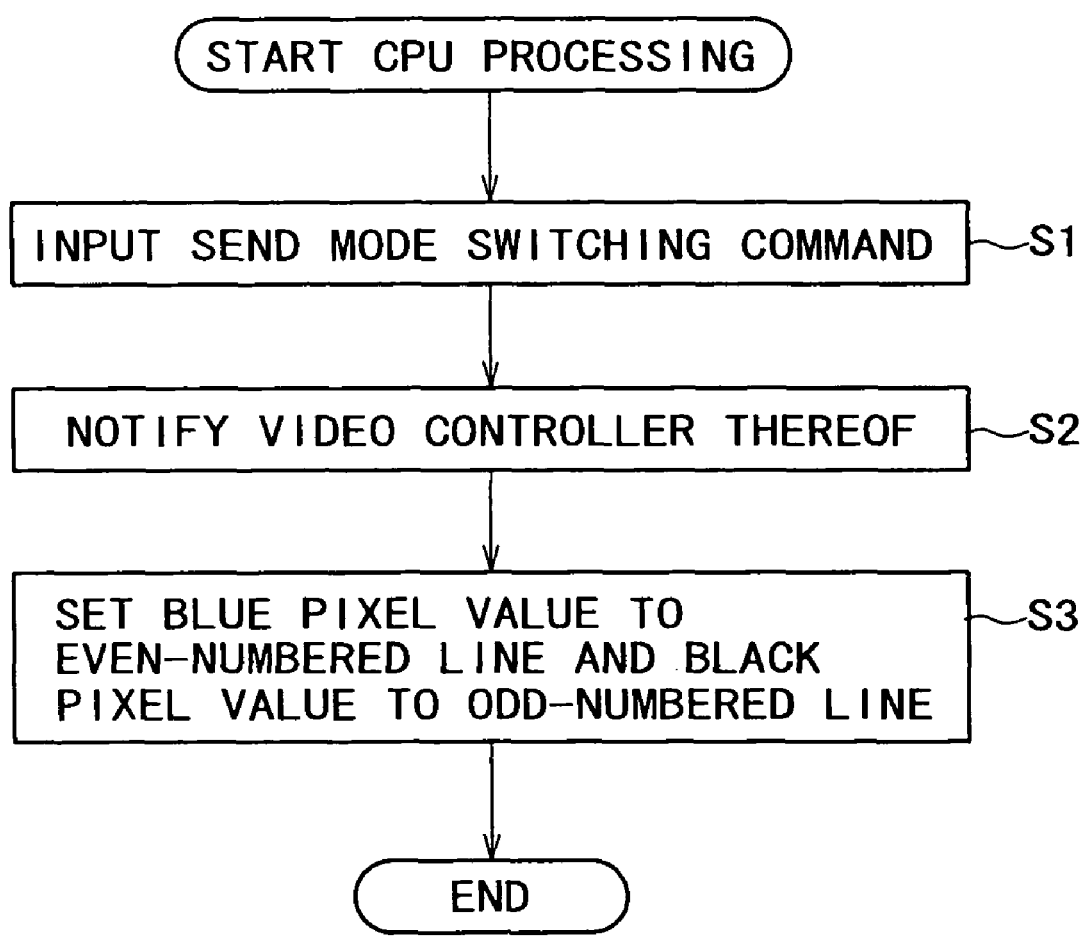
FIG. 12 is a flowchart describing the operation of the CPU of a personal computer for displaying a manipulated presentation image.

In step S14, the video controller 85 detects the pixels to which the black pixel values are set from the VRAM with the blue pixel values or the black pixel values set in step S3 shown in FIG. 12 and starts the processing of replacing the detected pixel values of the pixels by the pixel values of the pixels for one field retrieved in step S13 corresponding to the detected pixels.

In step S15, the video controller 85 starts the processing of outputting the one field with the pixel values replaced in step S14 to the LCD 31. Then, the above-mentioned procedure comes to an end.

Consequently, a manipulated presentation image formed by the even-numbered lines with blue displayed and the odd-numbered lines with a portion of the presentation image displayed is generated, so that, in the finder 206, a manipulated presentation image with the presentation image being transparent is displayed as shown in FIG. 10. Therefore, the user may easily distinguish a send image corresponding to the mainly performed send mode processing from the presentation image corresponding to the capture mode processing not being mainly performed and understand the contents of the presentation screen.

Then, the above-mentioned procedure comes to an end.

The following describes the operation of the video controller 85 of the personal computer 1 to be executed when converting an image displayed in 720×480 (for example, an image supplied from the video recorder 3) into an image displayed in 640×480 (an image corresponding to the size of the finder 206).

A signal inputted from the port replicator 2 connected to the I/O connector 43, for example a video signal (an analog signal) inputted from the video recorder 3, is inputted in the video decoder 84 via the I/O controller 103 and the I²C bus 95. Next, the video decoder 84 decodes the inputted video signal and stores the resultant image data into the incorporated frame memory (720 pixels×480 lines) (FIG. 15).

Figure 15:
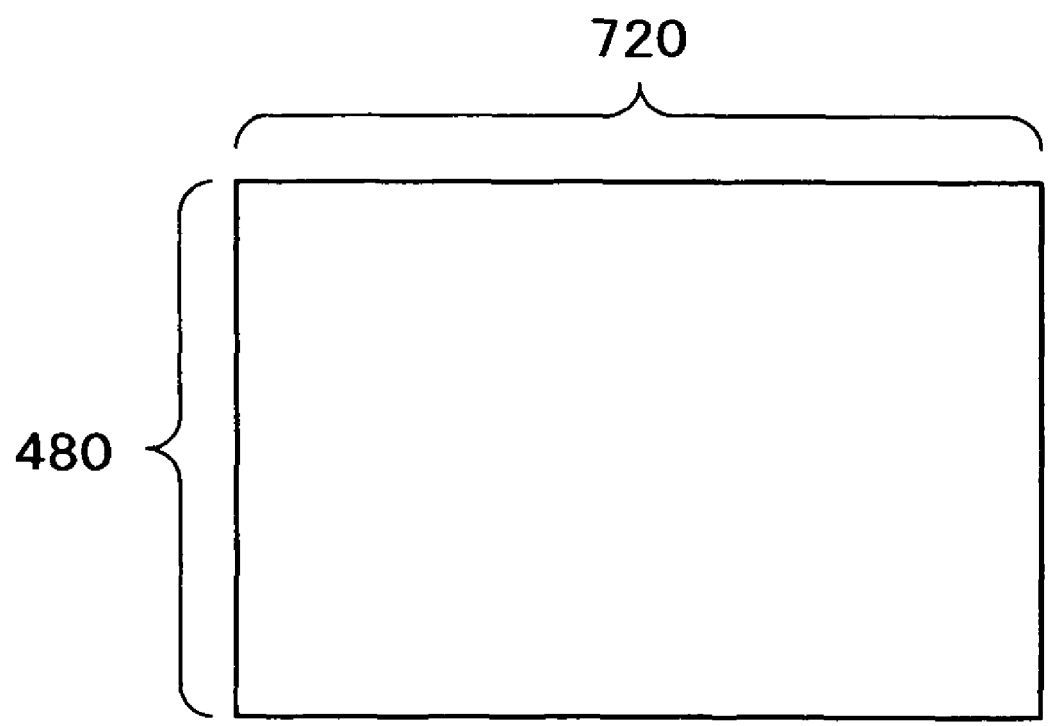
FIG. 15 illustrates the contents of the recording in a frame memory of a video decoder of a personal computer.

The video controller 85 takes 9 pixels which are arranged horizontally in FIG. 15 from the image data of 720×480 stored in the frame memory of the video decoder 84 and performs the processing of generating 8 pixels from these 9 pixels. Because 720 and 640 (the number of pixels in the horizontal direction) are in 9 to 8 relationship, an image of 640×480 may eventually generated by generating 8 pixels for every 9 pixels arranged in the horizontal direction of the 720×480 image.

Figure 16:
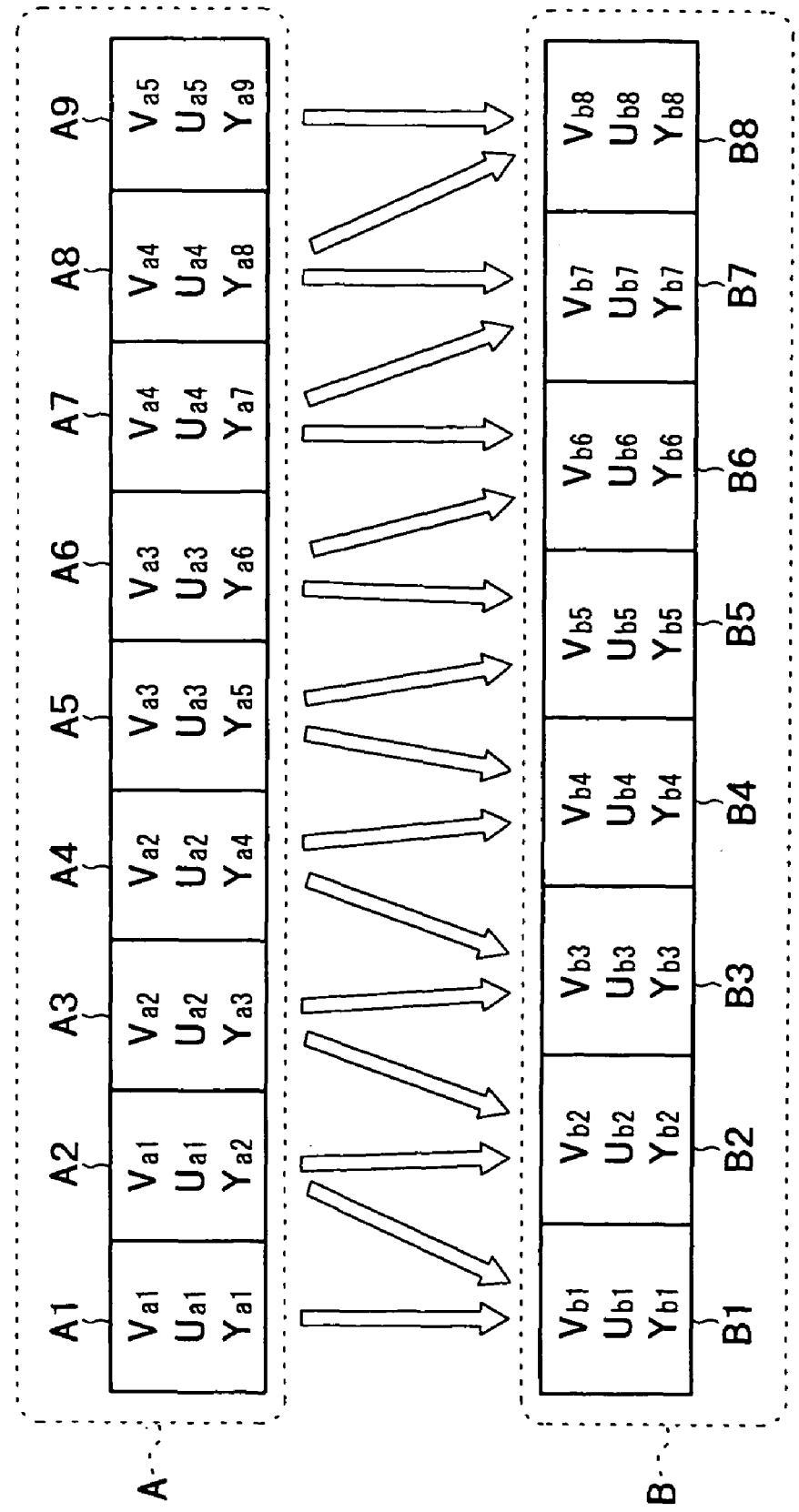
FIG. 16 illustrates a method of converting an image of 720×480 to an image of 640×480.
Figure 17:
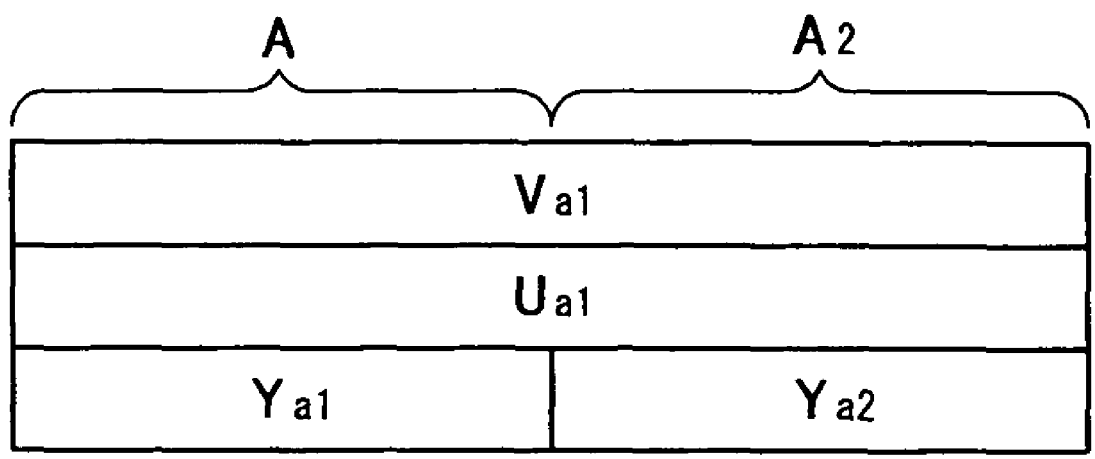
FIG. 17 illustrates a pixel configuration.

The following describes a more specific generating method with reference to FIG. 16. When any 9 pixels continuously arranged horizontally in an image of 720×480 are shown as with A of FIG. 16, a new pixel B1 (B of FIG. 16) forming an image of 640×480 is generated by computing color difference value Vb1, color difference value Ub1, and luminance value Yb1 by substituting color difference value Va1, color difference value Ua1, and luminance value Ya1 forming pixel A1 and color difference value Va1, color difference value Ua1, and luminance value Ya2 forming pixel A2 into the following equations. It should be noted that one pixel value is formed by color difference value V, color difference value U, and luminance value Y; in an image of 720×480, color difference value V and color difference value U are shared by adjacent pixels as shown in FIG. 17.

$$\text{Color difference value } Vb1 = (\text{color difference value } Va1 \times 8 + \text{color difference value } Va1 \times 1)/9$$

$$\text{Color difference value } Ub1 = (\text{color difference value } Ua1 \times 8 + \text{color difference value } Ua1 \times 1)/9$$

$$\text{Luminance value } Yb1 = (\text{luminance value } Ya1 \times 8 + \text{luminance value } Ya2 \times 1)/9$$

Color difference value Vb2, color difference value Ub2, and luminance value Yb2 forming pixel B2 are computed by substituting color difference Va1, color difference Ua1, and luminance Ya2 forming pixel A2 and color difference Va2, color difference Ua2, and luminance Ya3 forming pixel A3 into the following equations.

$$\text{Color difference value } Vb2 = (\text{color difference value } Va1 \times 7 + \text{color difference value } Va2 \times 2)/9$$

$$\text{Color difference value } Ub2 = (\text{color difference value } Ua1 \times 7 + \text{color difference value } Ua2 \times 2)/9$$

$$\text{Luminance value } Yb2 = (\text{luminance value } Ya2 \times 7 + \text{luminance value } Ya3 \times 2)/9$$

Color difference value Vb3, color difference value Ub3, and luminance value Yb3 forming pixel B3 are computed by substituting color difference value Va2, color difference value Ua2, and luminance value Ya3 forming pixel A3 and color difference value Va2, color difference value Ua2, and luminance value Ya4 forming pixel A4 into the following equations.

$$\text{Color difference value } Vb3 = (\text{color difference value } Va2 \times 6 + \text{color difference value } Va2 \times 3)/9$$

$$\text{Color difference value } Ub3 = (\text{color difference value } Ua2 \times 6 + \text{color difference value } Ua2 \times 3)/9$$

$$\text{Luminance value } Yb3 = (\text{luminance value } Ya3 \times 6 + \text{luminance value } Ya4 \times 3)/9$$

Color difference value Vb4, color difference value Ub4, and luminance value Yb4 forming pixel B4 are computed by substituting color difference value Va2, color difference value Ua2, and luminance value Ya4 forming pixel A4 and color difference value Va3, color difference value Ua3, and luminance value Ya5 forming pixel A5 into the following equations.

Color difference value $Vb4=$(color difference value $Va2\times 5$+color difference value $Va3\times 4$)/9

Color difference value $Ub4=$(color difference value $Ua2\times 5$+color difference value $Ua3\times 4$)/9

Luminance value $Yb4=$(luminance value $Ya4\times 5$+luminance value $Ya5\times 4$)/9

Color difference value Vb5, color difference value Ub5, and luminance value Yb5 forming pixel B5 are computed by substituting color difference value Va3, color difference value Ua3, and luminance value Ya5 forming pixel A5 and color difference value Va3, color difference value Ua3, and luminance value Ya6 forming pixel A6 into the following equations.

Color difference value $Vb5=$(color difference value $Va3\times 4$+color difference value $Va3\times 5$)/9

Color difference value $Ub5=$(color difference value $Ua3\times 4$+color difference value $Ua3\times 5$)/9

Luminance value $Yb5=$(luminance value $Ya5\times 4$+luminance value $Ya6\times 5$)/9

Color difference value Vb6, color difference value Ub6, and luminance value Yb6 forming pixel B6 are computed by substituting color difference value Va3, color difference value Ua3, and luminance value Ya6 forming pixel A6 and color difference value Va4, color difference value Ua4, and luminance value Ya7 forming pixel A7 into the following equations.

Color difference value $Vb6=$(color difference value $Va3\times 3$+color difference value $Va4\times 6$)/9

Color difference value $Ub6=$(color difference value $Ua3\times 3$+color difference value $Ua4\times 6$)/9

Luminance value $Yb6=$(luminance value $Ya6\times 3$+luminance value $Ya7\times 6$)/9

Color difference value Vb7, color difference value Ub7, and luminance value Yb7 forming pixel B7 are computed by substituting color difference value Va4, color difference value Ua4, and luminance value Ya7 forming pixel A7 and color difference value Va4, color difference value Ua4, and luminance value Ya8 forming pixel AB into the following equations.

Color difference value $Vb7=$(color difference value $Va4\times 2$+color difference value $Va4\times 7$)/9

Color difference value $Ub7=$(color difference value $Ua4\times 2$+color difference value $Ua4\times 7$)/9

Luminance value $Yb7=$(luminance value $Ya7\times 2$+luminance value $Ya8\times 7$)/9

Color difference value Vb8, color difference value Ub8, and luminance value Yb8 forming pixel B8 are computed by substituting color difference Va4, color difference Ua4, and luminance value Ya8 forming pixel A8 and color difference value Va5, color difference Ua5, and luminance value Ya9 forming pixel A9 into the following equations.

Color difference value $Vb8=$(color difference value $Va4\times 1$+color difference value $Va5\times 8$)/9

Color difference value $Ub8=$(color difference value $Ua4\times 1$+color difference value $Ua5\times 8$)/9

Luminance value $Yb8=$(luminance value $Ya8\times 1$+luminance value $Ya9\times 8$)/9

Figure 18:
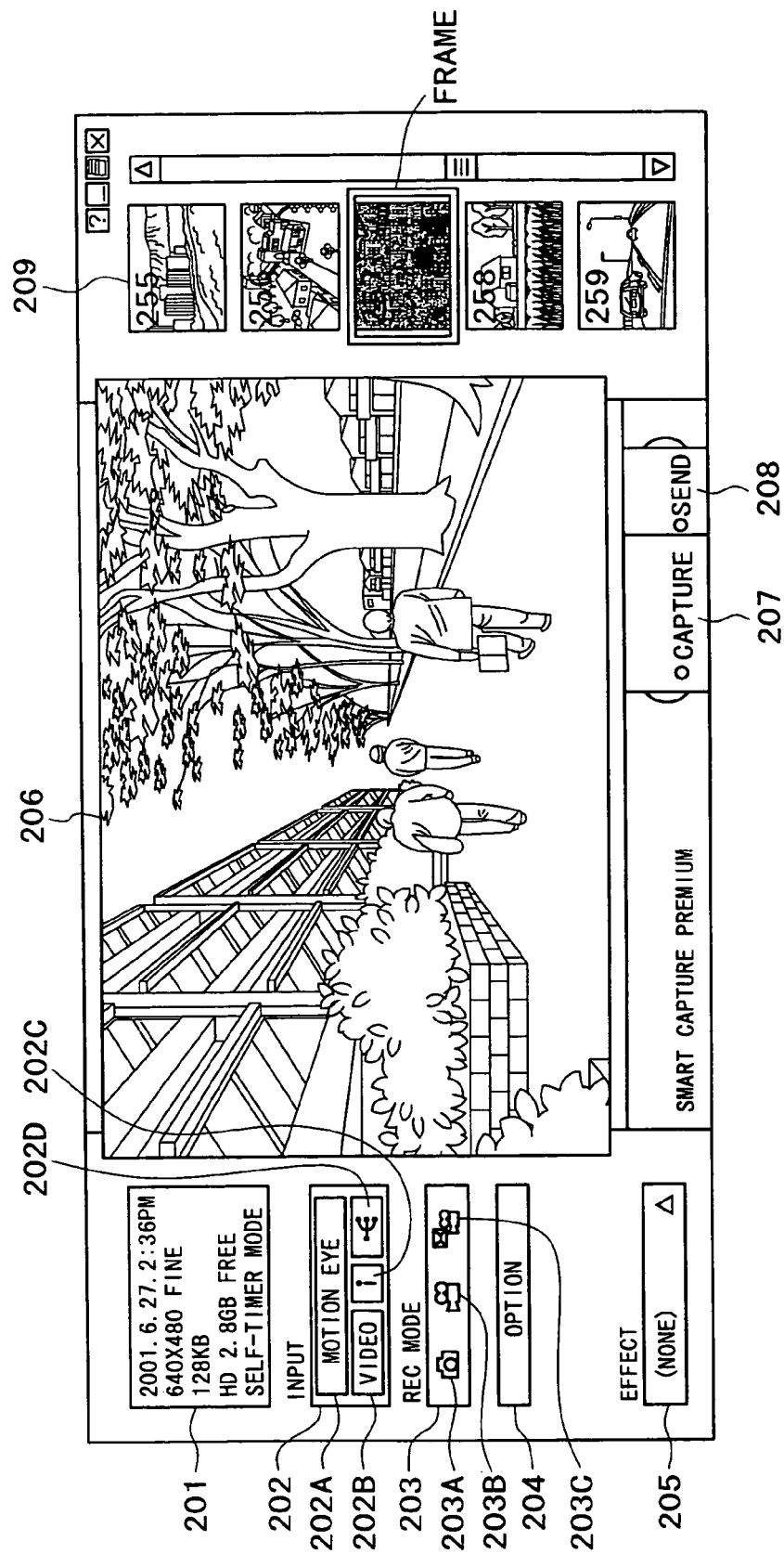
FIG. 18 illustrates another example of capture mode screen.

As described, an image of 720×480 is converted into an image of 640×480. If, for example, an image of 720×480 is displayed in the capture mode screen without being converted, the presentation image is displayed running over from the finder 206 as shown in FIG. 18.

Consequently, if that image is used as it is, the image information display section 201 through the effect button 205 and the capture button 207 through the file list 209 must be rearranged in order to provide a suitable capture mode screen.

On the other hand, when converting an image of 720×480 into an image of 640×480 for display, this image is displayed in correspondence with the size of the finder 206, so that the image information display section 201 and so on need not be rearranged.

Figure 19:
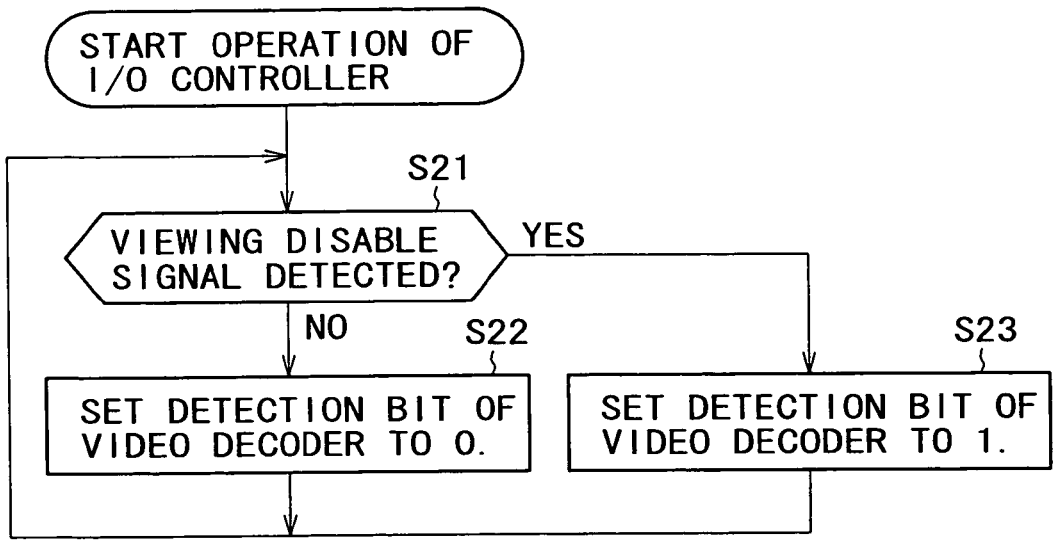
FIG. 19 is a flowchart describing the operation of an I/O controller of a personal computer for displaying an image corresponding to an AV signal superimposed with a viewing disable signal.

The following describes the operations of the I/O controller 103 and the video decoder 84 of the personal computer 1 to be executed when displaying, in corresponding to a viewing disable signal, an image corresponding to an AV signal (analog) inputted from the video recorder 3. First, the operation of the I/O controller 103 will be described with reference to the flowchart shown in FIG. 19.

In step S21, the I/O controller 103 determines whether or not a viewing disable signal has been detected from the AV signal of the video recorder 3 connected to the port replicator 2 (the AV IN connector 61) inputted from the I/O connector 43. If the viewing disable signal is found not detected, the procedure goes to step S22, in which the value of the detection bit incorporated in the video decoder 84 is changed to value 0.

On the other hand, if the viewing disable signal is found detected in step S21, then the procedure goes to step S23, in which the I/O controller 103 changes the value of the detection bit of the video decoder 84 to value 1.

When the detection bit of the video decoder 84 has been changed to the predetermined value in step S22 or S23, the I/O controller 103 returns to step S21 to repeat the processing thereafter.

Figure 20:
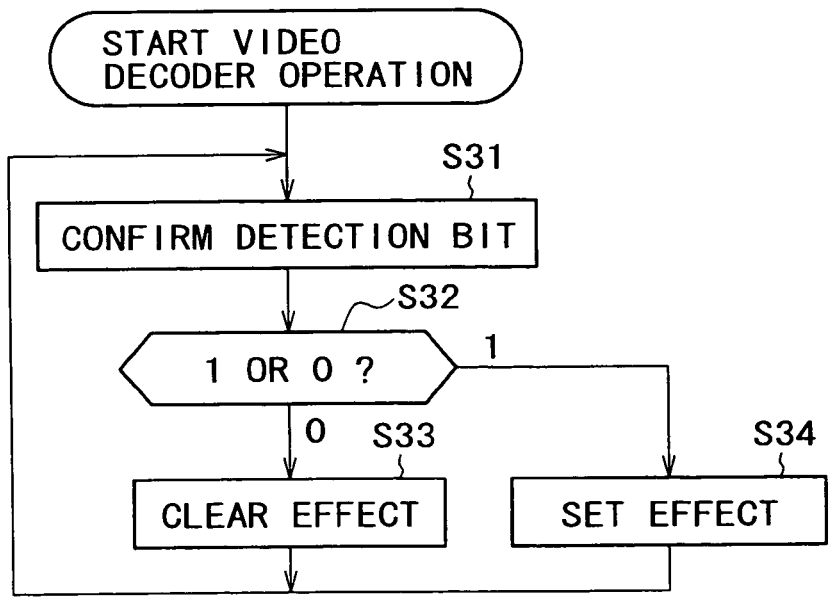
FIG. 20 is a flowchart describing the operation of a video decoder of a personal computer for displaying an image corresponding to an AV signal superimposed with a viewing disable signal.

The following describes the operation of the video decoder 84 with reference to the flowchart shown in FIG. 20.

In step S31, the video decoder 84 checks the value of the incorporated detection bit and determines in step S32 whether it is value 1 or value 0.

If the detection bit is determined to be value 0 in step S32, then the procedure goes to step S33, in which the video decoder 84 decodes the inputted video signal as usual and stores the resultant image data into the frame memory. Namely, in this case, the image (presentation image) inputted from the video recorder 3 is displayed in the finder 206 of the capture mode screen as it is.

On the other hand, if the detection bit is found to be value 1 in step S32, then the procedure goes to step S34, in which the video decoder 84 does not decode the inputted video signal but sets the black pixel values for example to the incorporated frame memory. Namely, in this case, a black screen is displayed in the finder 206 of the capture mode screen. Therefore, at this time, the user cannot view the image supplied from the video recorder 3.

After the process of step S33 or S34, the video decoder 84 returns to step S31 to repeat the processing thereafter.

Figure 21:
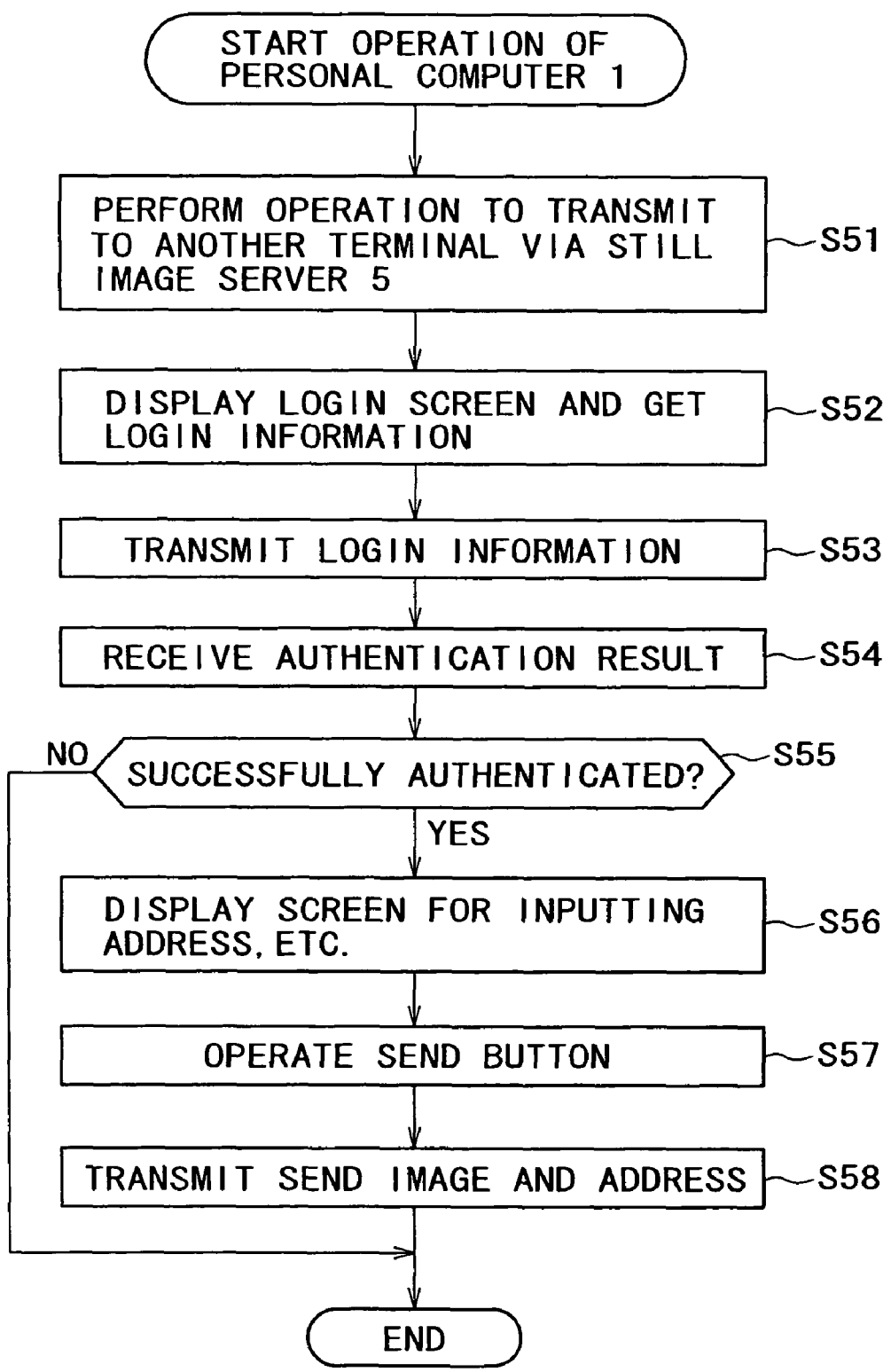
FIG. 21 is a flowchart describing the operation of a personal computer when a send image is transmitted to a server 5.

The following describes the operation of the personal computer 1 to transmit a send image to the server 5 to provide it from the server 5 to the terminal 6, with reference to the flowchart shown in FIG. 21.

In step S51, when the button 221C (the button to be operated to transmit a still image to another terminal via the server 5) of the send form specification section 221 of the send mode screen (FIG. 10) is operated, then the CPU 82 of the personal computer 1 controls the video controller 85 to display a login screen (not shown) for inputting the information such as the user name necessary for login in step S52 and, upon inputting of the login information, the procedure goes to step S53.

In step S53, the personal computer 1 transmits the login information inputted in step S52 to the server 5 via the port replicator 2 and the network 4 and, in step S54, receives the authentication result based on the login information from the server 5.

Next, in step S55, the CPU 82 of the personal computer 1 determines on the basis of the authentication result received in step S54 whether or not the user of the personal computer 1 has been successfully authenticated. If the user is found successfully authenticated, the procedure goes to step S56.

In step S56, the CPU 82 displays a screen for creating the address of send destination (in this example, the address of the terminal 6) and the mail to be transmitted to the send destination.

Next, In step S57, when the send button 208 in the send mode screen is operated, the procedure goes to step S58, in which the CPU 82 transmits the address and so on inputted in the screen shown in step S56 and the image (the image of the thumbnail enclosed by the frame in the file list 209) displayed in the view area 222 when the send button 208 was operated to the server 5.

If the user is found not successfully authenticated in step S55 or if the send image and address were transmitted to the server 5 in step S58, then the processing comes to an end.

Then, the above-mentioned processing comes to an end.

Figure 22:
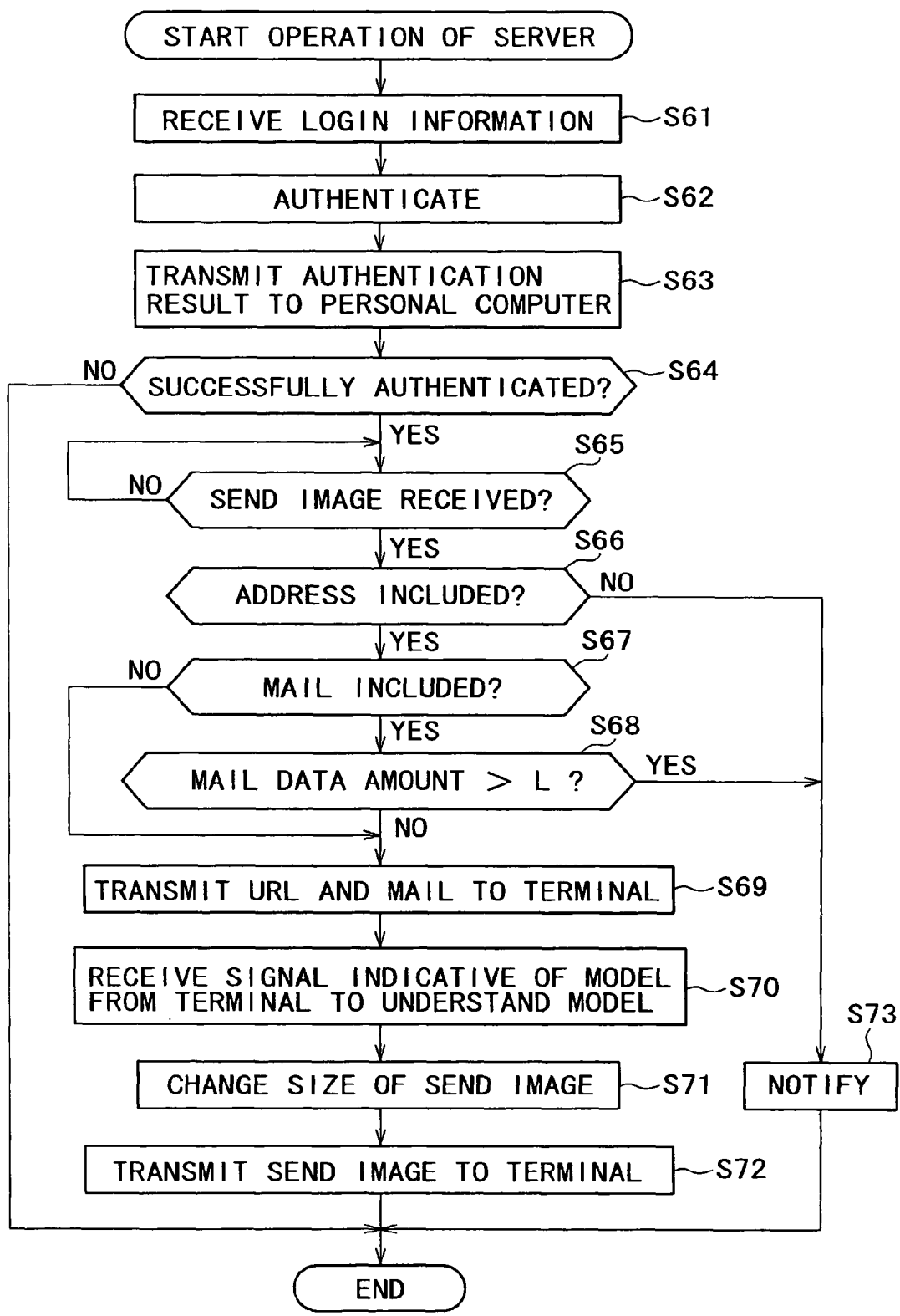
FIG. 22 is a flowchart describing the operation of a server when a send image is transmitted to a terminal 6.

The following describes the operation of the server 5 which is executed in response to the above-mentioned operation of the personal computer 1 with reference to the flowchart shown in FIG. 22.

In step S61, the server 5 receives the login information from the personal computer 1 (step S53 of FIG. 21) and performs authentication processing in step S62, transmitting an authentication result to the personal computer 1 in step S63.

Next, in step S64, the server 5 determines on the basis of the received authentication result in step S62 whether or not the user of the personal computer 1 is registered at this system. If the user is found registered, then the procedure goes to step S65 in which the server 5 waits until the send image and so on (step S58 of FIG. 21) transmitted from the personal computer 1 are received.

When the send image and so on are received from the personal computer 1 in step S65, the procedure goes to step S66, in which the server 5 determines whether or not the received data include the address of the send destination of the send image. If the address is found included, then the procedure goes to step S67.

In step S67, the server 5 determines whether or not the received data include mail (message). If mail is found included, then the procedure goes to step S68 to determine whether or not the data amount of the received mail is greater than predetermined data amount L.

If the mail is found not included in step S67 or the data amount of the received mail is found less than predetermined data amount L in step S68, then the procedure goes to step S69, in which the server 5 transmits the mail and URL (if no mail is included, the URL and mail including a predetermined message) received from the personal computer 1 to the address destination (in this example, the terminal 6).

Next, in step S70, in response to the URL and so on transmitted in step S69, the server 5 receives a signal from the terminal 6 (a signal indicative of the model of the terminal 6) to understand the type of the terminal 6.

In step S71, the server 5 determines the image processing capacity of the terminal 6 from the obtained model and changes the size of the send image supplied from the personal computer 1 for example so that the send image can be processed within the determined image processing capacity.

In step S72, the server 5 transmits the send image with its size changed in step S71 to the terminal 6.

If no address is found included in step S66 or if the data amount of the mail is found greater than predetermined data amount L in step S68, then the procedure goes to step S73, in which the server 5 notifies the personal computer 1 thereof.

If the user is found not registered in step S64 or if the send image was transmitted to the terminal 6 in step S72 or if the notification was made in step S73, the above-mentioned processing comes to an end.

Figure 23:
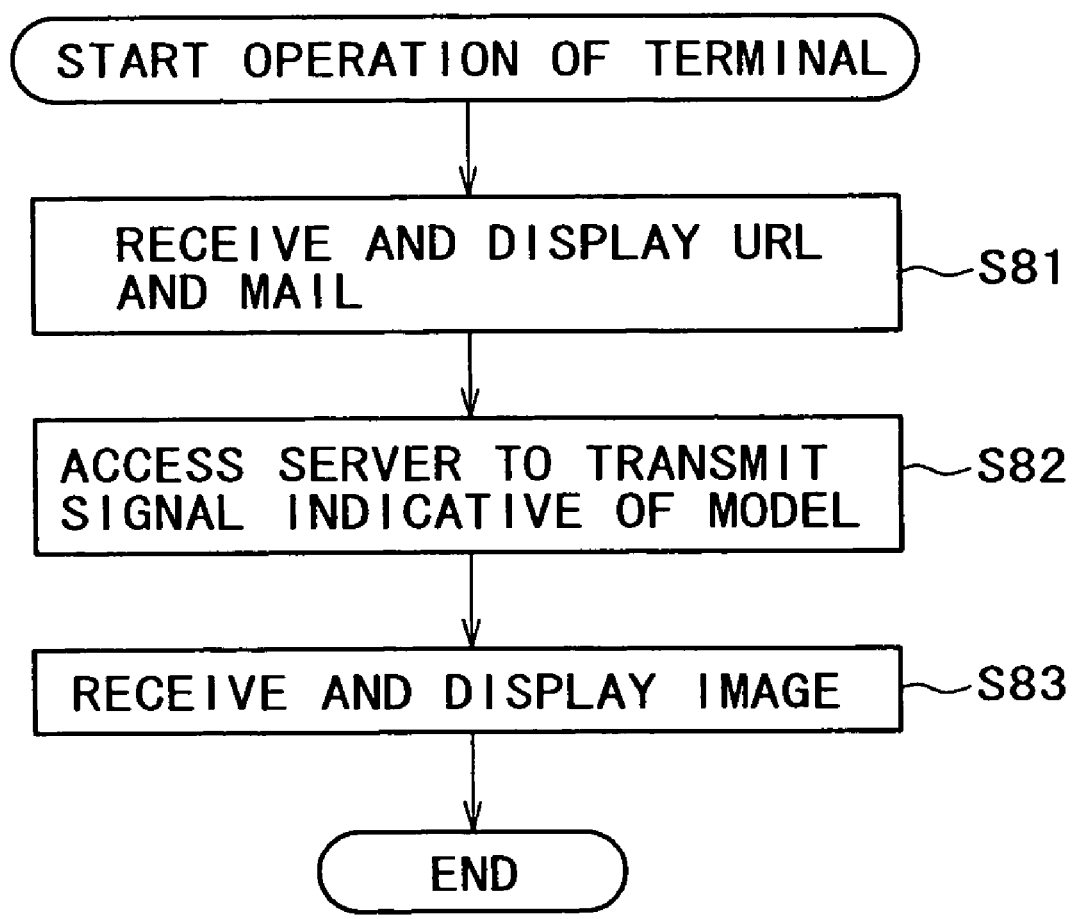
FIG. 23 is a flowchart describing the operation of a terminal when it receives a send image from a server.

The following describes the operation of the terminal 6 to be executed in response to the above-mentioned operation of the server 5 with reference to the flowchart shown in FIG. 23.

In step S81, the terminal 6 receives the URL and so on supplied from the server 5 (step S69 in FIG. 22) and displays them in response to the operation performed by the user on the terminal 6.

In step S82, when the URL of the server 5 is specified by the user, the terminal 6 accesses the server 5 to transmit a signal indicative of the terminal's model to the server 5.

Next, in step S83, the terminal 6 receives the send image transmitted from the server 5 (step S72 of FIG. 22) and displays the image appropriately.

Then, the above-mentioned processing comes to an end.

It should be noted that the steps describing each program include not only the processes which are sequentially executed in a time-dependent manner, but also those processes which are executed in parallel to each other or discretely.

INDUSTRIAL APPLICABILITY

As described and according to the information processing apparatus and program associated with the present invention, content is inputted, the address of a terminal is inputted, and the content and the address are transmitted to a server together. Consequently, the user can request the server for providing content to the terminal.

The invention claimed is:

1. An information processing apparatus to be connected to a network having a server and a terminal, the information processing apparatus comprising:
first inputting means for inputting source image data from an image recording device that captured an image of an object;
image data processing means for processing the source image data from the first inputting means to produce processed image data;
display means for displaying a capture mode displaying the source image data and a send mode displaying the processed image data, which is to be sent, and for simultaneously displaying, upon a switch from the capture mode to the send mode, said processed image and a manipulation, said manipulation including pixel values of said source image data and dummy values;
second inputting means for inputting an address of said terminal; and
means for transmitting said address of said terminal together with said processed image data to said server such that the server executes a processing for providing said processed image data to said terminal, wherein said image data processing means determines an image processing capacity of said terminal and converts an image size of said source image data such that said processed image data is commensurate with the image processing capacity of said terminal.

2. The information processing apparatus according to claim 1, wherein the image recording device is a part of the information processing apparatus.

3. The information processing apparatus according to claim 1, further comprising:
   third inputting means for inputting login information for logging in on said server, wherein said second inputting means, after said login information is inputted and an access to said server has been successfully authenticated, inputs said address of said terminal.

4. The information processing apparatus according to claim 1, further comprising:
   third inputting means for inputting an electronic document, wherein said means for transmitting transmits said address of said terminal and said electronic document along with said processed image data to said server to request said server to provide said processed image data and said electronic document to said terminal.

5. The information processing apparatus according to claim 1, wherein the imaging recording device is a video camera or a video recorder and is in communication with the image data processing means.

6. The information processing apparatus according to claim 1, further comprising:
   accepting means for receiving an electronic document over the network, wherein said means for transmitting transmits said electronic document to the terminal.

7. The information processing apparatus according to claim 6, wherein said means for transmitting detects a data amount of said electronic document and transmits an electronic document in accordance with the detected data amount to said terminal.

8. The information processing apparatus according to claim 1, wherein said manipulation includes a half of the pixel values of said source image data and an other half set to a predetermined value.

9. The information processing apparatus according to claim 8, further comprising:
   a controller configured to retrieve one field of image data from at least one of a video decoder and a video capture processing chip.

10. The information processing apparatus according to claim 1, wherein, in said send mode, the display means displays a send mode screen, including
   a file list including a plurality of image thumbnails,
   a view area including a selected image thumbnail which corresponds to the file list, and
   a send form specification section having buttons for selecting a send mode for transmitting the processed image data displayed in the view area to said server for a subsequent transmission to said terminal.

11. The information processing apparatus according to claim 1, wherein said image data processing means converts the image size of said source image data by computing a plurality of color difference values based on weighted averages of color difference values of adjacent pixels and by computing a luminance value based on weighted averages of luminance values of the adjacent pixels.

12. An information processing apparatus for requesting a server to provide content to a terminal, the information processing apparatus comprising:
   a first input configured to input source image data from an image recording device that captured an image of an object;
   an image data processor configured to process the source image data from the first input to produce processed image data;
   a display configured to display a capture mode displaying the source image data and a send mode displaying the processed image data, which is to be sent, and to simultaneously display, upon a switch from the capture mode to the send mode, said processed image data and a manipulation, said manipulation including pixel values of said source image data and dummy values;
   a second input configured to input an address of a terminal to which the processed image data is to be transmitted; and
   a transmitter configured to transmit said address of said terminal together with said processed image data over a network to the server such that the server executes a processing for providing said processed image data to said terminal, wherein
   said image data processor is further configured to determine an image processing capacity of said terminal and to convert an image size of said source image data such that said processed image data is commensurate with the image processing capacity of said terminal.

13. The information processing apparatus according to claim 12, wherein said manipulation includes a half of the pixel values of said source image data and an other half set to a predetermined value.

14. The information processing apparatus according to claim 13, further comprising:
   a controller configured to retrieve one field of image data from at least one of a video decoder and a video capture processing chip.

15. A method of an image processing apparatus for requesting a server to provide content to a terminal, the method comprising:
   inputting source image data from an image recording device that captured an image of an object;
   processing the source image data to produce processed image data;
   displaying at least one of a capture mode displaying the source image data and a send mode displaying the processed image data, which is to be sent;
   simultaneously displaying, upon a switch from the capture mode to the send mode, said processed image data and a manipulation, said manipulation including pixel values of said source image data and dummy values;
   inputting an address of said terminal; and
   transmitting said address of said terminal together with said processed image data over a network to said server such that the server executes a processing for providing said processed image data to said terminal, wherein
   said processing determines an image processing capacity of said terminal and converts an image size of said source image data such that said processed image data is commensurate with the image processing capacity of said terminal.

16. The method according to claim 15, wherein said manipulation includes a half of the pixel values of said source image data and an other half set to a predetermined value.

17. The method according to claim 16, further comprising:
   retrieving one field of image data from at least one of a video decoder and a video capture processing chip.

18. A non-transitory computer readable storage medium encoded with a computer program configured to cause an information processing apparatus to execute a method for requesting a server to provide content to a terminal, the method comprising:

inputting source image data from an image recording device that captured an image of an object;

processing the source image data to produce processed image data;

displaying at least one of a capture mode displaying the source image data and a send mode displaying the processed image data, which is to be sent;

simultaneously displaying, upon a switch from the capture mode to the send mode, said processed image data and a manipulation, said manipulation including pixel values of said source image data and dummy values;

inputting an address of said terminal; and transmitting said address of said terminal together with said processed image data over a network to said server such that the server executes a processing for providing said processed image data to said terminal, wherein said processing determines an image processing capacity of said terminal and converts an image size of said source image data such that said processed image data is commensurate with the image processing capacity of said terminal.

19. The method according to claim 18, wherein said manipulation includes a half of the pixel values of said source image data and an other half set to a predetermined value.

20. The method according to claim 19, further comprising:
retrieving one field of image data from at least one of a video decoder and a video capture processing chip.

* * * * *